United States Patent
Yoshida et al.

(10) Patent No.: US 9,570,952 B2
(45) Date of Patent: Feb. 14, 2017

(54) DISK MOTOR, ELECTRIC WORKING MACHINE INCLUDING DISK MOTOR AND METHOD FOR MANUFACTURING DISK MOTOR

(75) Inventors: Kenichirou Yoshida, Ibaraki (JP); Hideyuki Tanimoto, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 680 days.

(21) Appl. No.: 13/982,683

(22) PCT Filed: Jan. 31, 2012

(86) PCT No.: PCT/JP2012/052577
§ 371 (c)(1),
(2), (4) Date: Jul. 30, 2013

(87) PCT Pub. No.: WO2012/105709
PCT Pub. Date: Aug. 9, 2012

(65) Prior Publication Data
US 2013/0307367 A1    Nov. 21, 2013

(30) Foreign Application Priority Data

Jan. 31, 2011 (JP) .................................. 2011-017414
Jun. 28, 2011 (JP) .................................. 2011-142461

(51) Int. Cl.
*H02K 3/46* (2006.01)
*H02K 15/00* (2006.01)
(Continued)

(52) U.S. Cl.
CPC ...... *H02K 3/46* (2013.01); *H02K 3/26* (2013.01); *H02K 15/0056* (2013.01);
(Continued)

(58) Field of Classification Search
CPC ..... H02K 15/0056; H02K 15/02; H02K 21/24; H02K 23/54; H02K 3/26; H02K 3/46; Y10T 29/49009
(Continued)

(56) References Cited

U.S. PATENT DOCUMENTS 2,706,697 A * 4/1955 Eisler .................... H01F 27/027
                                            156/233
RE24,165 E * 6/1956 Eisler .................... H01F 27/027
                                             216/13
(Continued)

FOREIGN PATENT DOCUMENTS

JP    48-98303 A    12/1973
JP    58-139852 U    9/1983
(Continued)

OTHER PUBLICATIONS

Office Action for Japanese Patent App. No. 2011-017414 (Oct. 1, 2014) with English translation thereof.
(Continued)

*Primary Examiner* — Alex W Mok
(74) *Attorney, Agent, or Firm* — Kenealy Vaidya LLP

(57) ABSTRACT

A disk motor including: a rotor; a stator; an output shaft concentrically fixed to the rotor; at least one coil disk which is provided to one of the rotor or the stator, a coil pattern which includes a plurality of radial patterns or radial pattern groups extending outwards in a radial direction from a center part of the coil disk being formed on at least one surface of the coil disk; an electric current supply portion which supplies electric current to the coil pattern; a magnetic flux generating portion which is provided to another of the rotor or the stator and faces the coil pattern; and an intermediate pattern which is formed between adjacent radial patterns or adjacent radial pattern groups on the coil disk.

27 Claims, 14 Drawing Sheets

361: FIRST COIL DISK (UPPER SIDE)

(51) Int. Cl.
*H02K 3/26* (2006.01)
*H02K 15/02* (2006.01)
*H02K 21/24* (2006.01)
*H02K 23/54* (2006.01)

(52) U.S. Cl.
CPC ............. *H02K 15/02* (2013.01); *H02K 21/24* (2013.01); *H02K 23/54* (2013.01); *Y10T 29/49009* (2015.01)

(58) Field of Classification Search
USPC .................................... 310/198, 208; 29/596
See application file for complete search history.

(56) References Cited

U.S. PATENT DOCUMENTS

| | | | | | |
|---|---|---|---|---|---|
| 3,144,574 | A | * | 8/1964 | Henry-Baudot | H02K 3/26 310/237 |
| 3,171,051 | A | * | 2/1965 | Burr | H02K 3/26 310/268 |
| 3,193,715 | A | * | 7/1965 | Moressee | H02K 3/26 310/237 |
| 3,397,452 | A | * | 8/1968 | Taraud | H02K 3/26 174/262 |
| 3,549,928 | A | * | 12/1970 | Knapp | H02K 3/26 310/268 |
| 3,950,666 | A | * | 4/1976 | Lazaroiu | H02K 13/08 310/237 |
| 3,989,969 | A | * | 11/1976 | Lazaroiu | H02K 13/08 310/268 |
| 4,340,833 | A | * | 7/1982 | Sudo | H02K 3/26 310/207 |
| 6,005,324 | A | | 12/1999 | Kim | |
| 2002/0067102 | A1 | * | 6/2002 | Dunn | H02K 1/30 310/268 |
| 2005/0037183 | A1 | | 2/2005 | Hasegawa et al. | |
| 2008/0042515 | A1 | * | 2/2008 | Butterfield | H02K 3/26 310/268 |
| 2008/0100171 | A1 | | 5/2008 | Nakajima et al. | |
| 2009/0195106 | A1 | * | 8/2009 | Iki | H02K 3/26 310/208 |
| 2010/0244816 | A1 | * | 9/2010 | Nakamura | G01B 7/30 324/207.25 |
| 2011/0109304 | A1 | * | 5/2011 | Suzuki | H02K 24/00 324/207.25 |
| 2011/0239613 | A1 | * | 10/2011 | Isono | A01D 34/78 56/202 |

FOREIGN PATENT DOCUMENTS

| | | |
|---|---|---|
| JP | 62-61144 U | 4/1987 |
| JP | 01-126142 A | 5/1989 |
| JP | 05-030692 A | 2/1993 |
| JP | 9-45531 A | 2/1997 |
| JP | 9-232162 A | 9/1997 |
| JP | 11-75354 A | 3/1999 |
| JP | 2003-174749 A | 6/2003 |
| JP | 2004-80996 A | 3/2004 |
| JP | 3636700 B2 | 1/2005 |
| JP | 2006-157985 A | 6/2006 |
| JP | 2008-136337 A | 6/2008 |
| JP | 2009-303391 A | 12/2009 |
| JP | 2010-11550 A | 1/2010 |

OTHER PUBLICATIONS

Office Action for Japanese Patent App. No. 2011-142461 (Jan. 7, 2015) with English translation thereof.
International Search Report and Written Opinion of the International Search Report for PCT/JP2012/052577 dated Nov. 14, 2012.
Chinese Office Action for the related Chinese Patent Application No. 201280007216.X dated May 26, 2015.

* cited by examiner

1 : BUSH CUTTER

81: STATOR

82: ROTOR

35: COMMUTATOR SUBSTRATE

361: FIRST COIL DISK (UPPER SIDE)

361: FIRST COIL DISK (LOWER SIDE)

COMPARISON EXAMPLE

COMPARISON EXAMPLE
(UPPER SIDE)

COMPARISON EXAMPLE
(LOWER SIDE)

1035: COMMUTATOR DISK

1361A: FIRST LAYER 1094  1093

1361B: SECOND LAYER 1094  1095

1362A: THIRD LAYER 1094  1093

1362B: FOURTH LAYER 1094  1095

1363A: FIFTH LAYER 1094  1095

1363B: SIXTH LAYER 1094  1093

1364A: SEVENTH LAYER 1094  1095

1364B: EIGHTH LAYER 1094  1093

DISK MOTOR, ELECTRIC WORKING MACHINE INCLUDING DISK MOTOR AND METHOD FOR MANUFACTURING DISK MOTOR

This application is a U.S. national phase filing under 35 U.S.C. §371 of PCT Application No. PCT/JP2012/052577, filed Jan. 31, 2012, and which in turn claims priority under 35 U.S.C. §119 to Japanese Patent Application Nos. JP2011-017414 and JP2011-142461, filed Jan. 31, 2011 and Jun. 28, 2011 respectively, the entireties of which are incorporated by reference herein.

TECHNICAL FIELD

Aspects of the present invention relate to a disk motor having a construction in which at least two coil disks are bonded together and an electric working machine including the disk motor, and a method for manufacturing the disk motor.

Some other aspects of the present invention relate to a disk motor having coil disks on which coil patterns are formed and an electric working machine including the disk motor.

BACKGROUND ART

A disk motor described in Japanese Patent No. 3636700 mainly includes an output shaft, substantially circular disk-shaped coil disks which are fixed to the output shaft and on which coil patterns are printed, commutators connected to the coil patterns, magnets disposed so as to face the coil patterns and brushes for supplying electric current to the commutators.

The rotation speed of the disk motor is determined by a voltage supplied from the brushes, an electric current of the disk motor, the coil patterns of the coil disks, a magnetic flux of the magnets and the number of brushes (the number of poles). When the voltage supplied from the brushes and the electric current of the stator motor are constant, the disk motor can be set to a desired rotation speed by changing the coil patterns of the coil disks, the magnetic flux of the magnets, and the number of brushes.

A laminated coil substrate described in JP-A-2006-157985 has a construction in which dummy electrodes are formed on the same plane as coil electrodes, and an area where a space between the coil electrodes and the dummy electrodes becomes the least is sandwiched in a laminating direction together with part of the coil electrodes and part of the dummy electrodes by reinforcement electrodes which are laminated on the laminated coil substrate. By adopting this construction, the mechanical strength of the laminated coil substrate is attempted to be enhanced. The laminated coil substrate is a sintered substrate formed by sintering laminated ceramic green sheets.

A multi-layer substrate described in JP-A-H09-232162 prevents an epoxy resin of a bonding prepreg, which melts due to heat produced when substrates are laminated and bonded together, from flowing out between the substrates by providing a surrounding pattern which surrounds a coil pattern at the periphery of the coil pattern.

In a thin laminated coil described in JP-A-H09-45531, a dummy pattern which is electrically disconnected from a coil pattern is provided on at least an upper surface and a lower surface of double-faced substrates which face each other. According to this construction, an inter-layer sheet member (a prepreg) can be formed thin by a dummy pattern which is formed on a portion where the inter-layer sheet member is originally interposed. This provides not only an advantage that a loading amount of a resin which is to be impregnated in the inter-layer sheet member can be reduced but also an advantage that the dummy pattern forms a dam to prevent the leakage of the resin impregnated in the inter-layer sheet member to the periphery thereof.

JP-A-2004-80996 discloses a technique to increase the cooling and radiating performance of stator coils by increasing the cooling and radiating surface areas of the stator coils in a commutator motor.

SUMMARY OF INVENTION

Technical Problem

In the disk motor described in Japanese Patent No. 3636700, the area of the non-pattern-formed portion on the coil disk surface where no conductor pattern exists is large. Because of this, when plural coil disks of Japanese Patent No. 3636700 are laminated, the height of the non-pattern-formed portion is low, and therefore, the non-pattern-formed portion contributes a very little (or does not contribute) to the bonding of the coil disks. Thus, the substantial bonding contribution area is small, leading to a problem that the inter-layer bonding strength becomes low. On the other hand, the dummy electrodes and the surrounding patterns or dummy patterns which are disclosed in JP-A-2006-157985, JP-A-H09-232162 and JP-A-H09-45531 need to be provided outside the coil pattern. Therefore, when applied to a motor coil disk, it leads to increase in a radial dimension, and hence, the application to the motor coil disk is unrealistic.

Further, to obtain a high output in a disk motor, an electric current that flows to coil patterns need to be increased. When the electric current is increased, heat generated by electric resistance of the coil patterns becomes a problem. None of the patent literatures described above discloses preferred countermeasures against the heat generation problem. The technique disclosed in JP-A-2004-80996 is in relation to the cooling of the coils in which the winding is wound around the core and hence is not suitable for cooling coil disks having coil patterns through radiation.

Aspects of the invention has been made in view of these situations, and an object thereof is to provide a disk motor having at least two coil disks which are bonded to each other and adapted to increase a bonding strength with which the two coil disks are bonded together and an electric working machine including the disk motor, and a method for manufacturing the disk motor.

Further aspects of the invention has been made in view of these situations, and an object thereof is to provide a disk motor having a better radiating performance than that of a related-art disk motor and an electric working machine including the disk motor.

Solution to Problem

According to an aspect of the invention, there is provided a disk motor including: a rotor; a stator; an output shaft concentrically fixed to the rotor; at least one coil disk which is provided to one of the rotor or the stator, a coil pattern which includes a plurality of radial patterns or radial pattern groups extending outwards in a radial direction from a center part of the coil disk being formed on at least one surface of the coil disk; an electric current supply portion which supplies electric current to the coil pattern; a magnetic flux generating portion which is provided to another of the rotor or the stator and faces the coil pattern; and an intermediate pattern which is formed between adjacent radial patterns or adjacent radial pattern groups on the coil disk.

The coil disk may include at least two coil disks which are bonded to each other, the intermediate pattern may include a reinforcing pattern, and the surface of the coil disk on which the reinforcing pattern is formed may constitute a bonding surface with another coil disk.

The reinforcing pattern may include small patterns which are electrically insulated from each other.

Each of the small patterns may be narrower in width than the radial pattern and extend substantially parallel to the radial direction of the coil disk.

Each of the small patterns may be narrower in width than the radial pattern and extend substantially vertical to the radial direction of the coil disk.

A height of the reinforcing pattern from a substrate surface of the coil disk may be substantially the same as that of the coil pattern.

The reinforcing pattern may be made of the same material as that of the coil pattern.

The at least two coil disks may be bonded to each other via a sheet-shaped bonding layer which covers substantially an entire surface of the coil disk.

The plurality of radial patterns or radial pattern groups may be disposed at predetermined intervals in a circumferential direction of the coil disk.

The at least two coil disks may include a first coil disk and a second coil disk, the coil pattern may be provided on at least a first surface of the first coil disk and a second surface of the second coil disk, the first surface and the second surface facing each other, and the radial patterns or radial pattern groups on the first surface of the first coil disk may be positioned between adjacent radial patterns or radial pattern groups on the second surface of the second coil disk when viewed in an axial direction.

The coil pattern may be provided on both surfaces of the coil disk and may be connected to each other.

The magnetic flux generating portion may generate a magnetic flux to the radial patterns or radial pattern groups, and the intermediate pattern may include an extended radiating pattern which extends from the coil pattern.

The extended radiating pattern may extend only from an arbitrary one of the radial patterns.

A width of the extended radiating pattern may be equal to or thinner than a width of a portion of the coil pattern from which the extended radiating pattern extends.

The extended radiating pattern may extend in a substantially circumferential direction from the radial pattern.

A plurality of extended radiating patterns may extend in a comb tooth shape from both of adjacent radial patterns such that extended radiating patterns extending from one side enter between extended radiating patterns extending from another side.

The radial pattern may be made of the same material as that of the extended radiating pattern.

An electric current which flows through a portion of the coil pattern from which the extended radiating pattern extends may be larger than an electric current which flows through the extended radiating pattern.

The coil pattern may be formed on at least a first layer and a second layer, an independent radiating pattern which is isolated from the coil pattern on the first layer may be formed between adjacent radial patterns or radial pattern groups on the first layer, the extended radiating pattern may be formed on the second layer, and the independent radiating pattern and the extended radiating pattern may be connected to each other by a heat conductive material which penetrates through the layers.

The first layer may be positioned on one surface of the coil disk and the second layer may be positioned on another surface of the same coil disk.

A radiating hole which stretches between the independent radiating pattern and the extended radiating pattern may penetrate a substrate of the coil disk, and the radiating hole may have a conductive film on an inner surface thereof or may be filled with a conductive material.

The second layer may be positioned between the coil disk on which the second layer is formed and a different coil disk which is laminated on the coil disk on which the second layer is formed.

An entire surface of the independent radiating pattern may be exposed to air.

A width of the independent radiating pattern may be equal to or thinner than a width of the radial pattern.

The plurality of radial patterns or radial pattern groups may be formed so as to be disposed at predetermined intervals in the circumferential direction of the coil disk.

The coil disk may be provided to the rotor.

Another aspect of the invention provides an electric working machine including the above-described disk motor.

Another aspect of the invention provides a method for manufacturing a disk motor, the disk motor including, an output shaft, at least two coil disks which are concentrically fixed to the output shaft and are bonded top each other, a coil pattern which includes a plurality of radial patterns or radial pattern groups extending outwards in a radial direction from a center part of the coil disk being formed on at least one surface of the respective coil disks, an electric current supply portion which supplies electric current to the coil pattern, and a magnetic flux generating portion which faces the coil pattern, the method including: forming a reinforcing pattern between adjacent radial patterns or radial pattern groups together with the coil pattern when etching a conductor layer for forming the coil pattern on at least one of the coil disks; and fixedly bonding together the two coil disks at a surface where the reinforcing pattern is formed, with a sheet-shaped bonding layer which covers substantially an entire surface of each of the coil disks being sandwiched between the two coil disks.

Another aspect of the invention provides a disk motor including: an output shaft; at least one coil disk which is concentrically fixed to the output shaft, a coil pattern which includes a plurality of radial patterns or radial pattern groups extending outwards in a radial direction from a center part of the coil disk being formed on at least one surface of the coil disk; an electric current supply portion which supplies an electric current to the coil pattern; a magnetic flux generating portion which generates a magnetic flux to the radial patterns or radial pattern groups; and an extended radiating pattern which is formed on the coil disk and extends from the coil pattern.

An arbitrary combination of the constituent elements and what results from conversion of expressions of the invention between systems are also effective as a mode of the invention.

Advantageous Effects of Invention

According to aspects of the invention, the reinforcing patterns are formed between the adjacent radial patterns or the groups of radial patterns on at least one of the coil disks. Therefore, the disk motor which can enhance the bonding strength of the two coil disks higher than that provided by the conventional disk motor and the electric working machine including the disk motor and the method for manufacturing the disk motor can be realized.

Further, according to aspects of the invention, the extended radiating patterns which extend from the coil patterns are formed on the coil disks, and therefore, it is possible to realize the disk motor having the better radiating performance than that of the related-art disk motor and the electric working machine including the same disk motor.

DESCRIPTION OF EMBODIMENT

Figure 1:
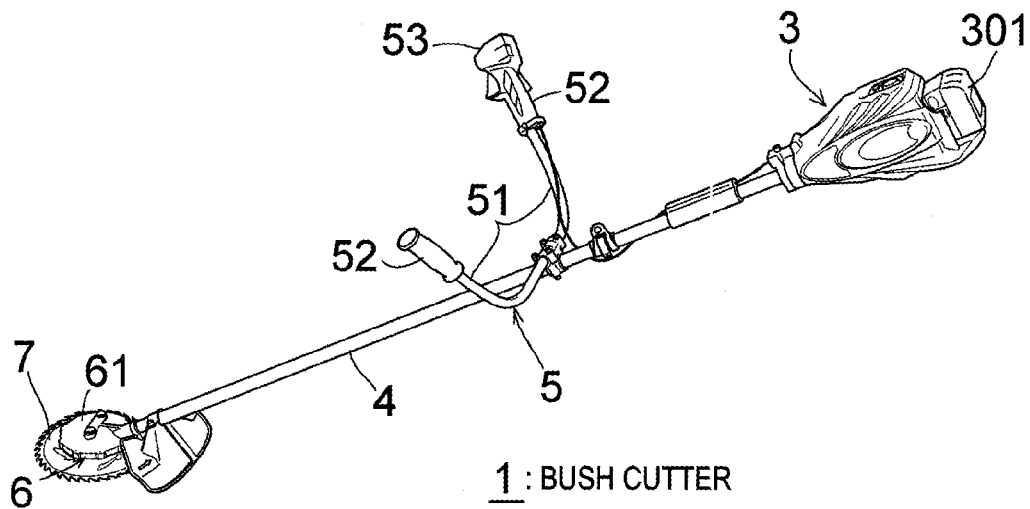
FIG. 1 is a perspective view of a bush cutter as an electric working machine according to an embodiment of the invention.

Hereinafter, preferred exemplary embodiments of the invention will be described in detail by reference to the drawings. Like reference numerals will be given to like or similar constituent elements, members and procedures shown in the drawings, and the repetition of the same description will be omitted. The exemplary embodiment does not limit the invention but illustrates an example of the invention. Characteristics or a combination thereof described in the exemplary embodiment does not necessarily constitute an essential part of the invention.

First Exemplary Embodiment

FIG. 1 is a perspective view of a bush cutter 1 according to the first exemplary embodiment of the invention. The bush cutter 1, which is an example of an electric working machine, includes a power supply unit 3, a pipe unit 4, a handle unit 5, a drive unit 6 and a cutter blade 7.

The power supply unit 3 has a detachable battery 301 which functions as a power supply. The pipe unit 4 mechanically connects (couples) the power supply unit 3 and the drive unit 6 together. In addition, a wiring (not shown) is routed through an interior of the pipe unit 4 so as to electrically connect the power supply unit 3 and the drive unit 6 together. An electric power is supplied from the power supply unit 3 to the drive unit 6 by this wiring. In the drive unit 6, a disk motor is accommodated in an interior of a head housing 61, and the cutter blade 7 is driven to rotate by the disk motor to which electric power is supplied from the power supply unit 3. The configuration of the disk motor will be described later.

The handle unit 5 is fixedly mounted in the middle of the pipe unit 4, that is, between the power supply unit 3 and the drive unit 6. The handle unit 5 includes a pair of arms 51 and grips 52 which are mounted at distal ends of the arms 51. A throttle 53 is provided at one of the grips 52. The operator can adjust the supply of electric power to the drive unit 6 or the rotation speed of the cutter blade 7 by controlling the throttle 53. The cutter blade 7 has a substantially circular disk-like shape, and saw-tooth serrations are formed along a circumferential edge of the cutter blade 7. A hole (not shown in the drawing) is formed in the center of the cutter blade 7, and the cutter blade 7 is mounted on an output shaft of the disk motor, which will be described later, at this hole.

Figure 2:
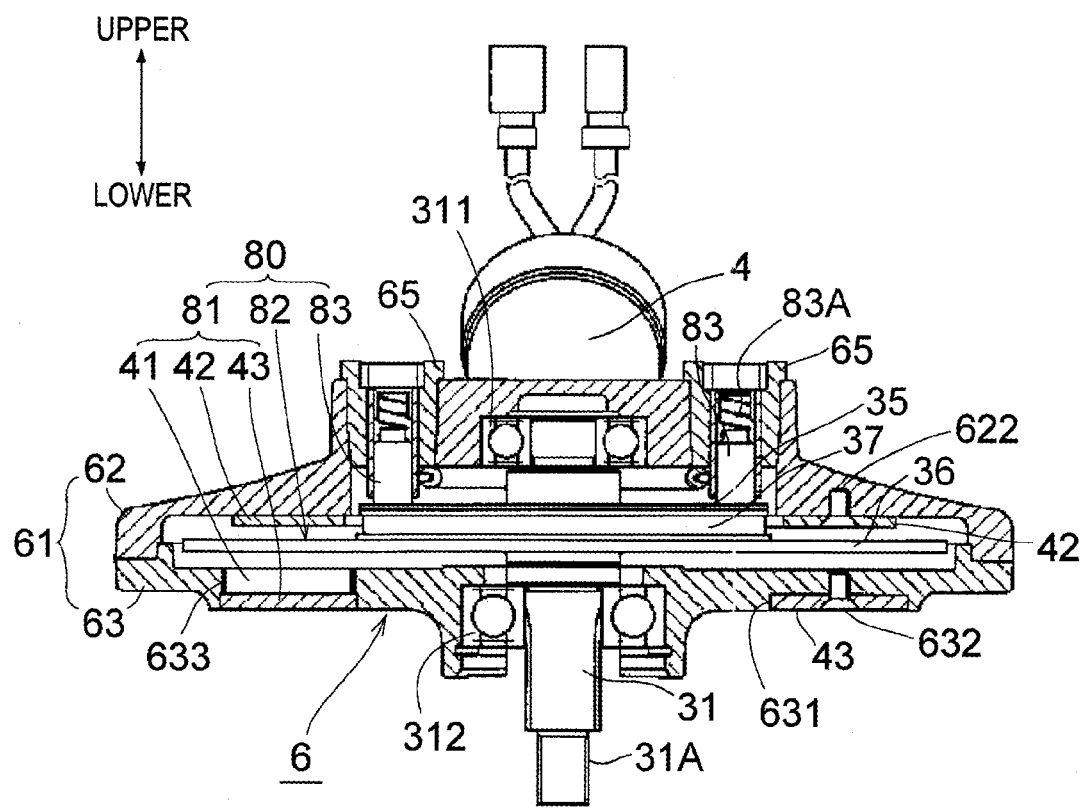
FIG. 2 is a front sectional view of a drive unit of the bush cutter shown in FIG. 1.

FIG. 2 is a front sectional view of the drive unit 6 of the bush cutter 1 shown in FIG. 1. As shown in FIG. 2, a direction in which an output shaft 31 of a disk motor 80 extends is defined as a vertical direction. The drive unit 6 has the disk motor 80 in an interior of a head housing 61. The head housing 61 includes a cover portion 62 and a base portion 63 which are integrally fitted together. The disk motor 80 has a start 81, a rotor 82 and a pair of brushes 83. The pair of brushes 83 are provided symmetrically with respect to the rotational shaft (the output shaft 31) of the disk motor 80 and are supported by brush holders 65 of the cover portion 62. Each brush 83 is biased towards a commutator substrate 35, which will be described later, (downwards) by a spring 83A so that a lower surface thereof is brought into abutment with a commutator pattern of a conductor such as copper which is formed on the commutator substrate 35. The brushes 83 are connected to the power supply unit 3 shown in FIG. 1 and function as a power supply portion for supplying an electric current to a coil pattern, which will be described later, of the rotor 82.

The stator 81 has magnets 41 which function as magnetic flux generating portions, as well as an upper yoke 42 and a lower yoke 43 which are made of a soft magnetic material. The upper yoke 42 having a ring shape is fixed to a lower surface of the cover portion 62 with screws 622, for example. The lower yoke 43 also has a ring shape and a diameter which is substantially the same as that of the upper yoke 42. The lower yoke 43 is fixed in a ring-shaped groove portion 631 formed on a lower surface of the base portion 63 with screws 632, for example. The magnets 41 are fitted in hole portions 633 formed on an upper surface of the base portion 63 and are fixed in place therein.

Figure 3:
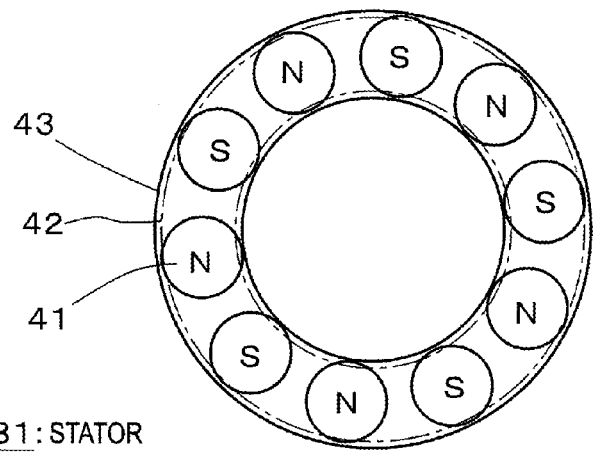
FIG. 3 is an exemplary plan view of a stator shown in FIG. 2.

FIG. 3 is an exemplary plan view of the stator 81 shown in FIG. 2. As shown in FIG. 3, for example, 10 magnets 41 having, for example, a circular disk shape are disposed circumferentially at equal angular intervals (the same number of hole portions 633 like the one shown in FIG. 2 are also provided so as to be aligned circumferentially for accommodation of the magnets 41 therein). A center of the circumference substantially coincides with a rotational center of the disk motor 80. Magnetic poles at upper surfaces of the adjacent magnets 41 are different from each other. As the magnets 41, rare earth magnets such as neodymium magnets are preferred. However, sintered magnets such as ferrite magnets may be used as the magnets 41. The upper yoke 42 and the lower yoke 43 are intended to enhance a magnetic flux density applied to a coil pattern on the rotor 82, which will be described later.

As shown in FIG. 2, the rotor 82 has the output shaft 31 (a rotor shaft), the commutator substrate 35, a coil portion 36 and a flange 37. The output shaft 31 is rotatably supported by an upper bearing 311 which is fixed to the cover portion 62 and a lower bearing 312 which is fixed to the base portion 63. A male thread 31A is formed on a lower end portion of the output shaft 31 and the cutter blade 7 shown in FIG. 1 is fixed thereto by a fastening device, not shown. An upper surface of the commutator substrate 35 constitutes a sliding surface of the brushes 83. Electric power is supplied to the coil portion 36 from the power supply unit 3 shown in FIG. 1 via the brushes 83 and the commutator substrate 35.

Figure 4:
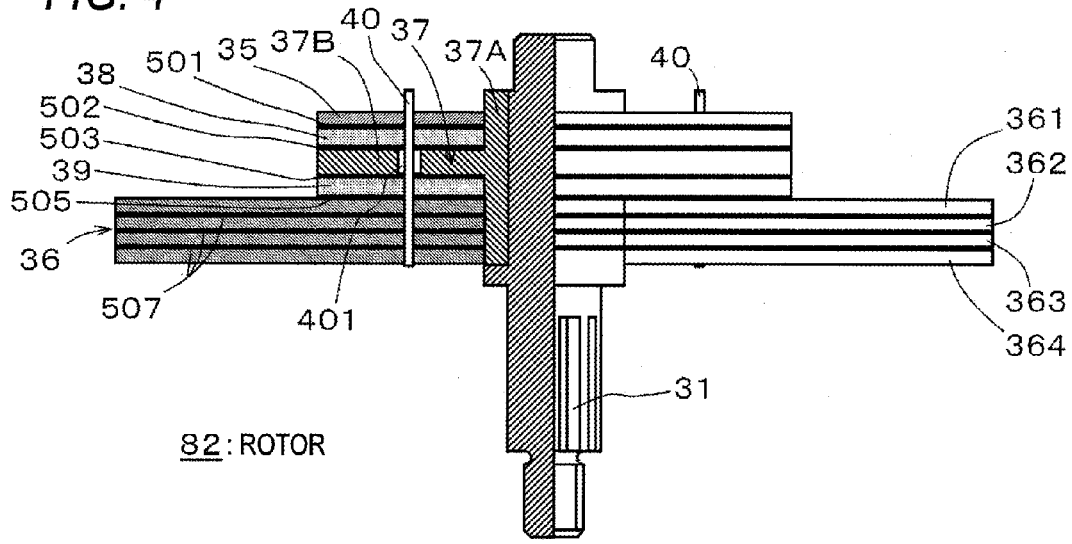
FIG. 4 is a front view of a rotor shown in FIG. 2, with a left-half portion thereof sectioned.

FIG. 4 is a front view of the rotor 82 shown in FIG. 2 with a left-half portion sectioned. The flange 37 is made of metal such as aluminum and is concentrically fixed to the output shaft 31. This flange 37 includes, as shown in FIG. 4, a cylindrical portion 37A having a substantially cylindrical shape and a circular disk portion 37B having a substantially circular disk shape. The circular disk portion 37B projects outwards from a side surface of the cylindrical portion 37A in a normal direction to the output shaft 31. Insulation plates 38, 39 having the same shape as that of the circular disk portion 37B as viewed axially are bonded to be fixed to upper and lower surfaces of the circular disk portion 37B, respectively, by sheet-shaped bonding layers 502, 503 (having insulating properties) which also has the same shape as that of the circular disk portion 37B. The commutator substrate 35 is bonded to be fixed to an upper surface of the insulation sheet 38 via a sheet-shaped bonding layer 501 (having insulating properties). The coil portion 36 is bonded to be fixed to a lower surface of the insulation sheet 39 via a sheet-shaped bonding layer 505 (having insulation properties).

The coil portion 36 includes first to fourth coil disks 361 to 364 which are laminated together with sheet-shaped bonding layers 507 (having insulating properties) sandwiched therebetween. Each sheet-shaped bonding layer 507 has the same shape as that of each coil disk as viewed axially and covers substantially entirely a surface of each coil disk. The first to fourth coil disks 361 to 364 are larger in diameter than the circular disk portion 37B. Coil patterns, which will be described later, are formed on both surfaces of each coil disk. A conductor pin 40 penetrates from the commutator substrate 35 to the fourth coil disk 364 and electrically connects a commutator pattern on the commutator substrate 35 with the coil patterns of at least any of the first to fourth coil disks 361 to 364. An insulation pipe 401 is fitted in a through hole (an insertion hole for the pin 40) in the circular disk portion 37B so as to ensure insulation between the pin 40 and the flange 37.

Figure 5:
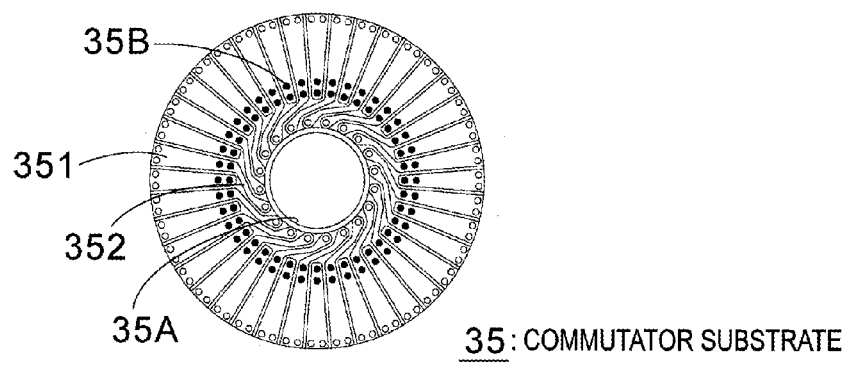
FIG. 5 is a plan view of a commutator substrate shown in FIG. 4 according to a first exemplary embodiment of the invention.

FIG. 5 is a plan view of the commutator substrate 35 shown in FIG. 4. A through hole 35A formed in a center of the circular disk-shaped commutator substrate 35 (a commutator disk) is formed so that the cylindrical portion 37A shown in FIG. 4 is inserted therethrough. A predetermined number of pin insertion holes 35B are provided equidistant from the center of the commutator substrate 35, and pins like the pin 40 shown in FIG. 4 are selectively inserted through some of the pin insertion holes 35B. A commutator pattern 351 formed on the commutator substrate 35 is divided radially into 40 segments. Two segments having seven segments therebetween (for example, a first segment and a ninth segment, a second segment and a tenth segment) are connected to each other by connection patterns 352 formed radially inside of the segments and connection patterns, not shown, which are formed on an opposite surface.

Figure 6A:
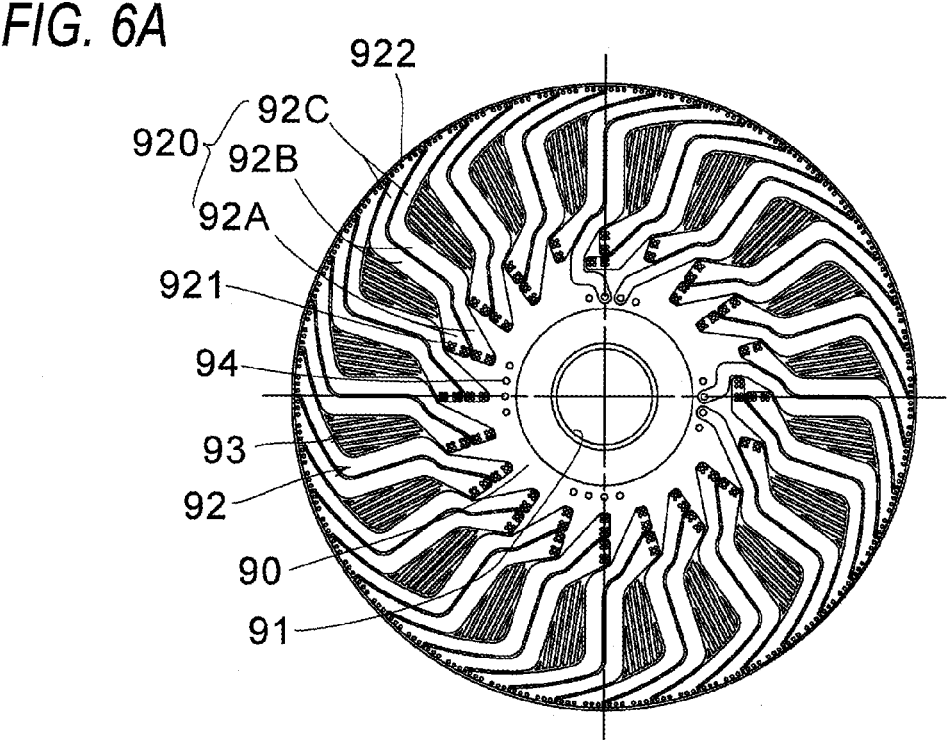
FIG. 6A is a plan view of a first coil disk shown in FIG. 4.
Figure 6B:
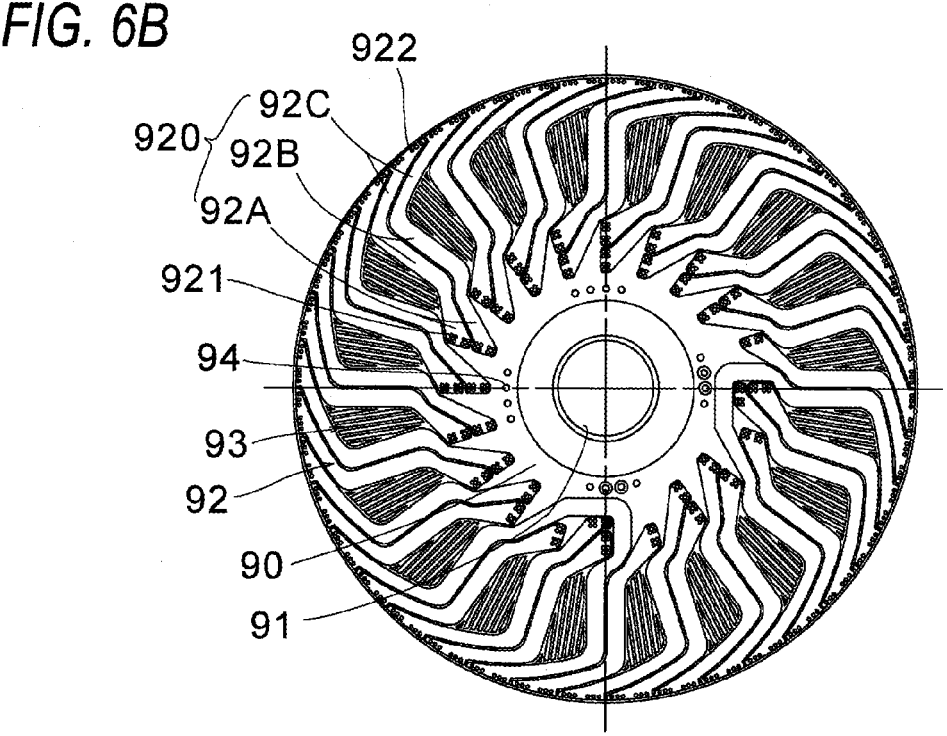
FIG. 6B is a bottom view of the coil disk, according to the first exemplary embodiment of the invention.

FIG. 6A is a plan view of the first coil disk 361 shown in FIG. 4. FIG. 6B is a bottom view of the same coil disk. The other coil disks have the same construction and coil patterns as those of the first coil disk 361, and therefore, only the first coil 361 will be described here.

The first coil disk 361 has coil patterns 92 and reinforcing patterns 93 on both surfaces of a circular disk-shaped insulation substrate 90 (for example, an insulation resin substrate such as a glass fiber reinforced epoxy resin substrate). A through hole 91 formed in a center of the insulation substrate 90 is formed so that the cylindrical portion 37A shown in FIG. 4 is inserted therethrough. A total of 16 pin insertion holes 94 are formed with groups of four pin holes aligned circumferentially around the center of the insulation substrate 90 at angular intervals of 90°. Distances from the pin insertion holes 94 to the center of the insulation substrate 90 are equal to each other. Each pin insertion hole 94 communicates with one of the pin insertion holes 35B formed in the commutator substrate 35.

The coil patterns 92 are made of copper or other conductive materials. The coil patterns 92 include partial coil pattern groups 920 and 20 partial coil pattern groups 920 are provided on each surface of the insulation substrate 90. Each partial coil pattern group 920 includes two rows of elongated patterns which lie close to each other and have substantially the same width. The partial coil pattern group 920 is formed by connecting sequentially an inner communication pattern group 92A, a radial pattern group 92B and an outer communication pattern group 92C in that order. The inner communication pattern groups 92A on both the surfaces of the insulation substrate 90 are electrically connected to each other by through holes 921 which are formed in the vicinity of end portions of the elongated patterns. The outer communication pattern groups 92C on both the surfaces of the insulation substrate 90 are electrically connected to each other by through holes 922 which are formed in the vicinity of the other end portions of the elongated patterns. The radial pattern group 92B extends radially outwards from the center of the insulation substrate 90 so as to be stretched between the inner communication pattern group 92A and the outer communication pattern group 92C. The radial pattern groups 92B on both the surfaces of the insulation substrate 90 are present substantially in the same position as viewed axially. The radial pattern groups 92B of each coil disk are positioned directly above a circumference along which the magnets 41 are aligned (a circumference along which centers of the magnets 41 are aligned). Namely, the radial pattern groups 92B pass directly above the magnets 41 as each coil disk rotates. A rotational force is obtained by an electromagnetic force between an electric current which flows to the radial pattern groups 92B and magnetic fields generated by the magnets 41.

The radial pattern groups 92B on each surface of the insulation substrate 90 are disposed at equal angular intervals around the center of the insulation substrate 90. Consequently, on the surface of the insulation substrate 90, there are areas where no coil pattern 92 exists (hereinafter, also referred to as an "inter-radial pattern group area") between the adjacent radial pattern groups 92B. The reinforcing patterns 93 are provided in these inter-radial pattern group areas. The reinforcing patterns 93 are made of the same material as that of the coil patterns 92. A height of the reinforcing pattern 93 from the surface of the insulation substrate 90 is substantially the same as that of the coil pattern 92. The coil patterns 93 serves to enhance the bonding force between the laminated coil disks. This will be described later.

Figure 7A:
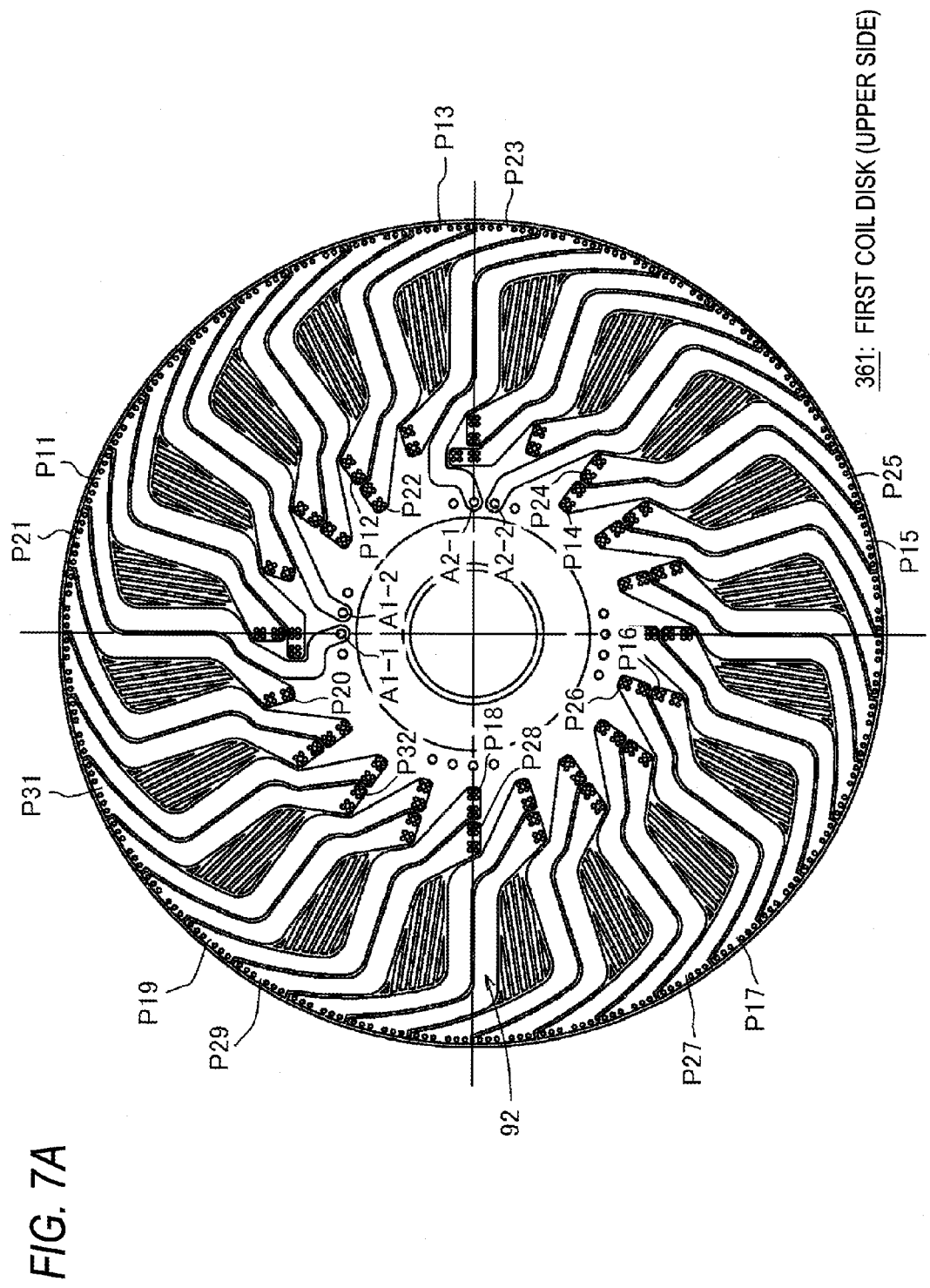
FIG. 7 (7A, 7B) shows explanatory diagrams of a coil pattern of the first coil disk, according to the first exemplary embodiment of the invention.
Figure 7B:
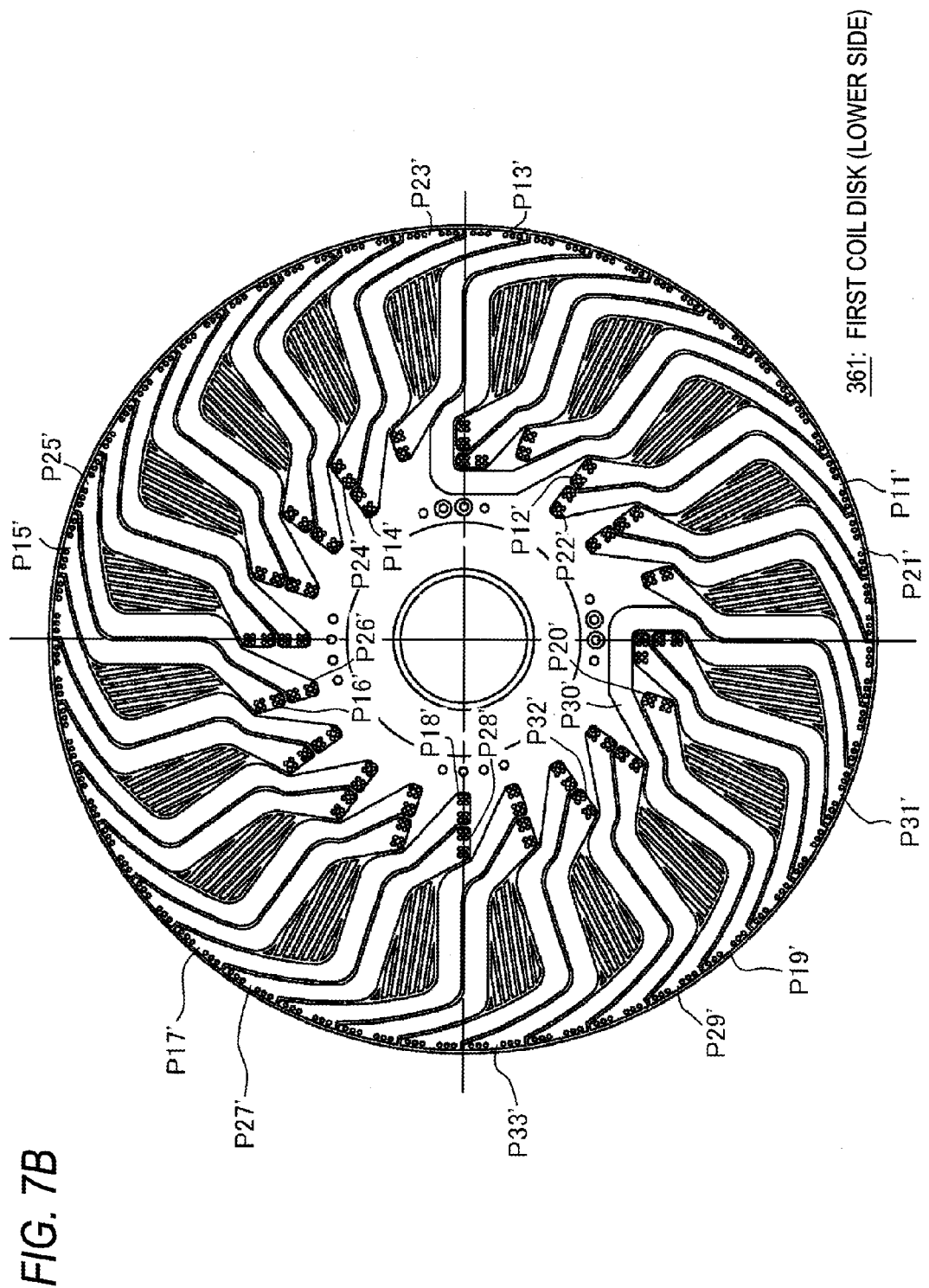

FIGS. 7A and 7B are explanatory diagrams of the coil pattern on the first coil disk 361. The drawings are identical with FIGS. 6A and 6B excluding reference numerals given thereto. The coil pattern 92 of the first coil disk 361 includes two coils. In FIG. 7A, an initiating point and a terminating point of one coil are denoted by A1-1 and A1-2, respectively. Additionally, an initiating point and a terminating point of the other coil are denoted by A2-1, A2-2, respectively. The one coil extends from the initiating point A1-1 to points P11, P11', P12', P12, P13, P13', . . . , P19', P20'. In this way, when viewed from above, the one coil extends clockwise from the initiating point A1-1 to complete a first round. Then, the one coil extends further from point 20' in a similar fashion to points P20, P21, P21', P22', P22, P23, P23', . . . , P29', P30'. In this way, when viewed from above, the one coil extends clockwise from the initiating point A1-1 to complete a second round. Then, the one coil extends counterclockwise further from point P30' in a similar fashion to point P31', P31, P32, P32', P33' and reaches the terminating point A1-2 after having extended two rounds from the point P30'. The other coil extends from the initiating point A2-1 to the terminating point A2-2 in a similar fashion.

Then, the four, first to fourth coil disks 361 to 364 which are configured as described above are laminated together in the axial direction (the laminating direction) to make up the coil portion 36. The coils of the different coil disks are electrically connected by the aforesaid pins 40 shown in FIG. 4. 12 pins 40 are necessary to complete a proper connection of the four coil disks. Here, when connecting the coil patterns 92 formed on the two coil disks in series, the two coil disks may be laminated together while offsetting the phases thereof so that one of the through holes of one coil disk is positioned to coincide with the other of the through holes of the other coil disk. By this configuration, the coil portion 36 of the two coil substrates is formed by laminating the four coil disks 361 to 364 together so that the coil patterns formed thereon coincide with each other or are offset from each other at a predetermined angle as viewed axially. In the case of the coil patterns being angularly offset from each other, the reinforcing patterns 93 on one coil disk face the coil patterns 92 of the adjacent coil disk as viewed axially in such a state that the four coil disks are laminated together.

Figure 8A:
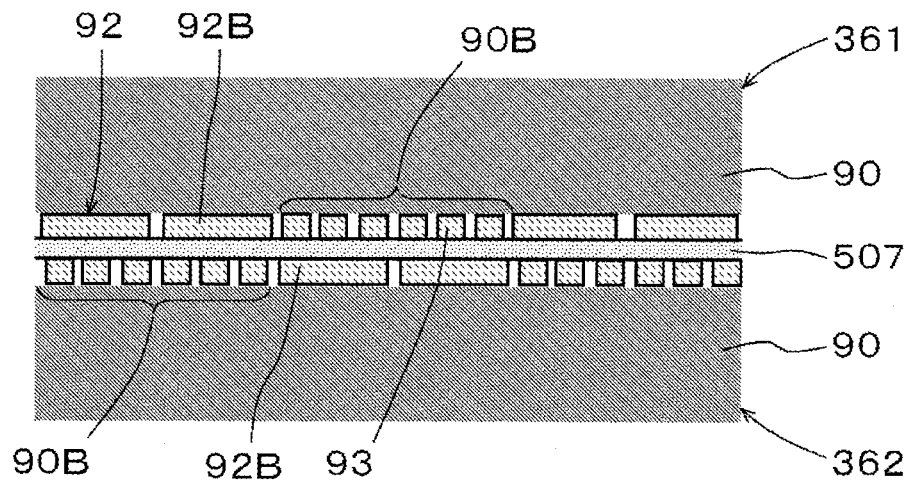
FIG. 8A is an enlarged sectional view of a lamination of the first coil disk and a second coil disk which are shown in FIG. 4.
Figure 8B:
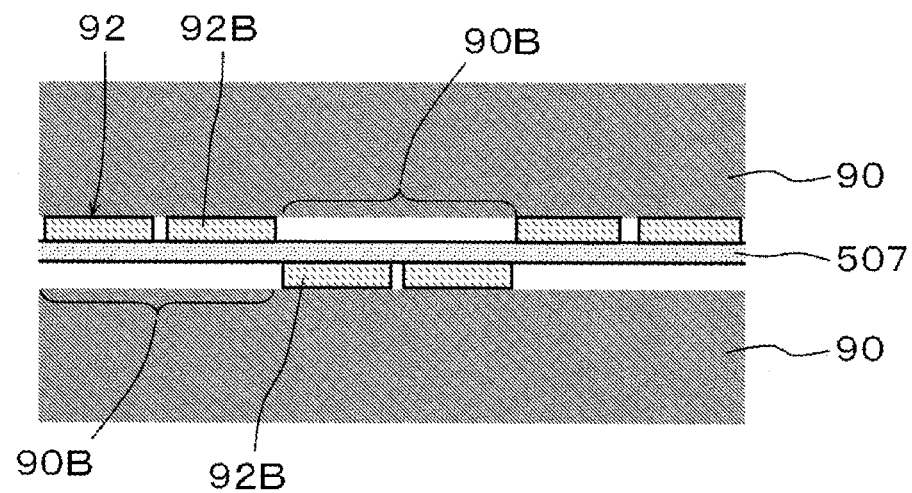
FIG. 8B is an enlarged sectional view of a lamination of a first and second coil disk of a comparison example in which reinforcing patterns are removed from FIG. 8A, according to the first exemplary embodiment of the invention.
Figure 9A:
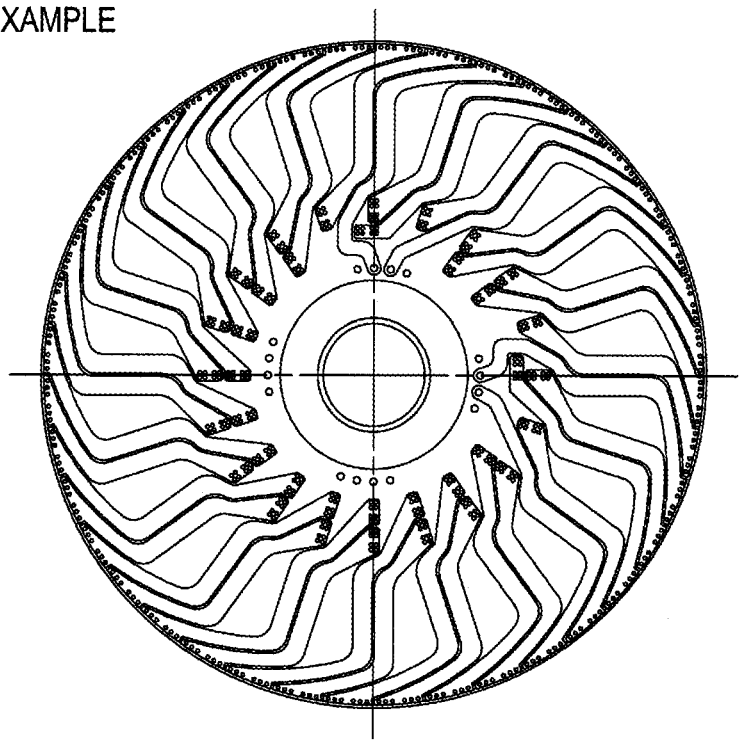
FIG. 9A is a plan view of the coil disk according to the comparison example shown in FIG. 8B.
Figure 9B:
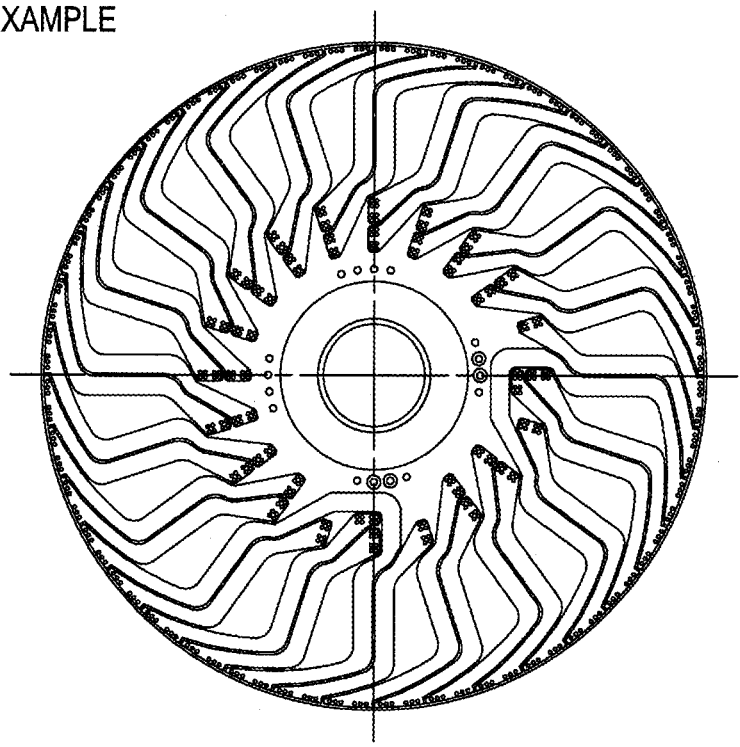
FIG. 9B is a bottom view of the coil disk according to the comparison example, according to the first exemplary embodiment of the invention.

FIG. 8A is an enlarged sectional view showing a lamination of the first coil disk 361 and the second coil disk 362 shown in FIG. 4. A section showing a lamination of the other coil disks is also similar to the section shown in FIG. 8A, and therefore, only the section showing the lamination of the first coil disk 361 and the second coil disk 362 will be described here. FIG. 8B is an enlarged sectional view of a comparison example to FIG. 8A in which the reinforcing patterns 93 provided between the first and second coil disks shown in FIG. 8A are removed. FIG. 9A is a plan view of the coil disk according to the comparison example shown in FIG. 8B. FIG. 9B is a bottom view of the coil disk according to the comparison example.

As shown in FIG. 8B, when no reinforcing pattern 93 exists in the inter-radial pattern group areas 90B of the insulation substrates 90, although the sheet-shaped bonding layer 507 adheres to the radial pattern groups 92B of the coil patterns 92, the sheet-shaped bonding layer 507 does not reach the surfaces of the inter-radial pattern group areas 90B and does not adhere thereto. Alternatively, even though the sheet-shaped bonding layer 507 is made so thick as to reach the surfaces of the inter-radial pattern group areas 90B as a result of being pressed at the time of lamination, since the contact pressure is low, the bonding force is weak. Namely, the inter-radial pattern group areas 90B does not contribute to the bonding of the insulation substrates 90. Alternatively, if they contribute, the contribution is a little. Consequently, the bonding force between the laminated coil disks is also weak, and it is difficult to ensure the reliability. Additionally, the increase in thickness of the bonding layer 507 triggers a problem that the projection costs are increased.

On the other hand, when the reinforcing patterns 93 exist in the inter-radial pattern group areas of the insulation substrates 90, as shown in FIG. 8A, not only the radial pattern groups 92B of the coil patterns 92 but also the reinforcing patterns 93 adhere to the sheet-shaped bonding layer 507. Because of this, when compared to the case where no reinforcing pattern 93 exists as shown in FIG. 8B, a large bonding area can be ensured so as to strengthen the bonding force between the coil disks, thereby making it possible to enhance the reliability. In addition, even though the bonding layer 507 is thin, the strong bonding force can be ensured, which is advantageous in reduction of thickness and reduction of production cost.

As shown in FIG. 6A, the reinforcing pattern 93 is made up of seven small patterns the width of which is thinner than the single radial pattern which makes up the radial pattern group 92B. Each small pattern extends radially outwards from a central portion of the insulation substrate 90. The inter-disk bonding force is effectively increased even though the reinforcing pattern 93 is not divided into the small patterns in the way described above. However, in the event that the reinforcing pattern 93 is a single wide conductor layer, for example, there is caused a problem that a large eddy-current loss is produced by eddy currents generated in the reinforcing pattern 93 as the insulation substrate 90 rotates. Consequently, the reinforcing pattern 93 is preferably divided in the way described above from the viewpoint of efficiency.

Hereinafter, a method for manufacturing the disk motor 80 will briefly be described.

A conductor material such as copper is laminated on both surfaces of a circular disk-shaped insulation substrate, and a mask is then placed on both the surfaces of the insulated substrate for etching (an etching step). Required through holes and pin insertion holes are formed before or after the etching step. Thus, four coil disks 361 to 364 as shown in the drawings such as FIG. 6A are obtained on which coil patterns 92 and reinforcing patterns 93 are formed. In addition, a commutator substrate 35 as shown in FIG. 5 on which a commutator pattern 351 is formed is also obtained in a similar fashion.

As shown in FIG. 4, pins 40 are inserted through the pin insertion holes formed, and sheet-shaped bonding layers 501 to 503, 505, 507 which are in a prepreg state (for example, thin sheets made of a glass fiber base material impregnated with an epoxy resin and set partially cured) are sandwiched between the layers of the commutator substrate 35 and the coil disks 361 to 364 to be laminated together on the flange 37 and set in a mold for hot pressing (the commutator substrate 35 and the coil disks 361 to 364 are pressed together on to the flange 37 in the laminated direction while being heated) (a bonding step). Before the hot pressing operation is started, the pins 40 and the coil disks 361 to 364 which are laminated together are soldered together. Additionally, the commutator substrate 35 and the pins 40 are soldered together after the hot pressing operation is completed, and projecting unnecessary portions of the pins 40 are cut off. The rotor 82 obtained as shown in FIG. 4 is combined with the stator 81 and the brushes 83 as shown in FIG. 2, whereby the disk motor 80 is completed.

According to the first exemplary embodiment, the following advantages can be provided.

(1) The reinforcing patterns 93 are formed between the adjacent radial pattern groups 92B. Therefore, when compared to the case where no reinforcing pattern 93 exists between the adjacent radial pattern groups 92B, the bonding force between the laminated coil disks can be increased. Because of this, high reliability can be ensured even in a product which generates vibrations of a large magnitude or a product to which impact is easily imparted depending on the way in which it is used.

(2) The reinforcing patterns 93 are formed of the same material as that of the coil patterns 92 and are also formed to the same height from the surface of the substrate as that of the coil patterns 92. Therefore, both the reinforcing patterns 93 and the coil patterns 92 can be formed altogether through a single etching operation. Thus, the reinforcing patterns 93 and the coil patterns 92 can be manufactured easily and inexpensively. Namely, no additional step is required for forming the reinforcing patterns 93.

(3) The reinforcing patterns 93 are each made up of the small patterns the width of which is thinner than the single radial pattern which makes up the radial pattern group 92B. Therefore, the eddy-current loss is small, and good efficiency can be provided. Namely, due to the characteristics of the project which is the disk motor, the magnetic flux which penetrates the inter-radial pattern group areas invariably varies with time. Therefore, for example, in the event that a conductive layer which is large enough to cover substantially the whole of the inter-radial pattern group areas is provided in order to ensure the bonding force, a problem is caused that the eddy-current loss is increased. However, according to the invention, such a problem can preferably be solved.

(4) The reinforcing patterns 93 are formed in the inter-radial pattern group areas, and therefore, the area of the insulation substrate 90 does not have to be increased for provision of the reinforcing patterns 93 thereon.

Thus, while the invention has been described by reference to the first exemplary embodiment, it is obvious to those skilled in the art to which the invention pertains that various modifications can be made to the constituent elements and the process in which they are treated of the first exemplary embodiment without departing from the scope of claims that will be claimed later. Hereinafter, modified examples will be described.

Figure 10:
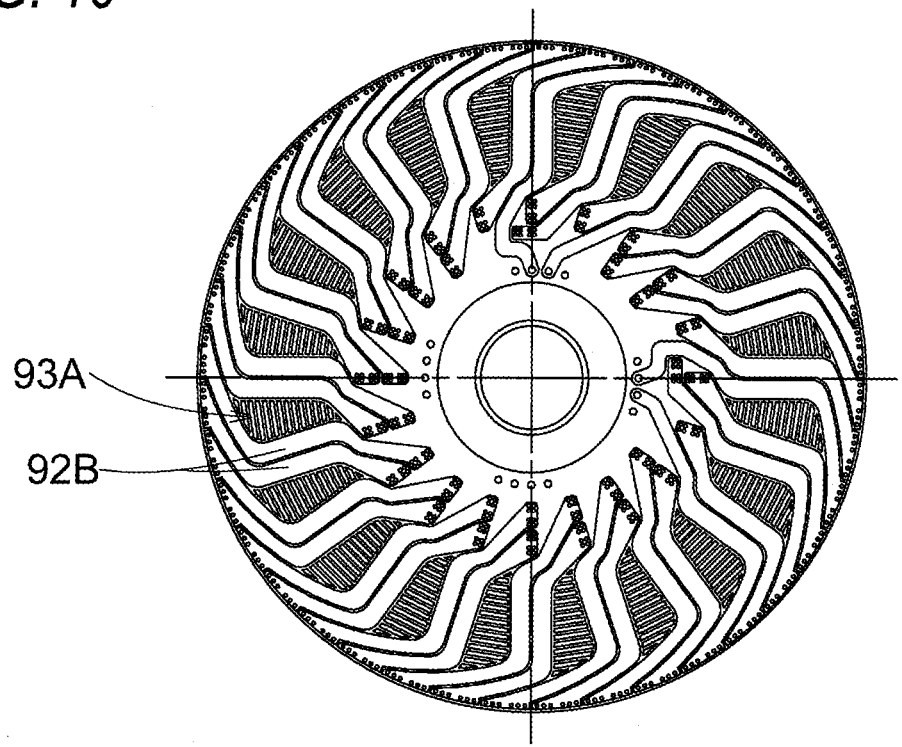
FIG. 10 is a plan view of a coil disk having a reinforcing pattern (Part 1) which is different from the example shown in FIG. 6A, according to the first exemplary embodiment of the invention.

FIG. 10 is a plan view of a coil disk having a reinforcing pattern (Part 1) which is different from the example shown in FIG. 6A. The coil disk shown in FIG. 10 has the same configuration as that of the coil disk shown in FIG. 6A excluding the shape of reinforcing patterns. As shown in FIG. 10, reinforcing patterns 93A according to this modified example are each made up 15 small patterns the width of which is thinner than the single radial pattern which makes up a radial pattern group 92B and which extends substantially perpendicular to a radial direction of the coil disk. Also, reinforcing patterns on an opposite surface of the coil disk are each made up of similar small patterns (not shown). With the reinforcing patterns provided according to this modified example, the eddy-current loss can also be suppressed to a low level. In addition, by providing the small patterns in a direction in which the magnets move, even in the event that an eddy current of a minute magnitude is generated, a direction in which an eddy current is easily generated coincides with the direction in which the magnets move, that is, a direction which is at right angles to the rotational direction. Therefore, the influence imposed on the rotation of the rotor can be suppressed further.

Figure 11:
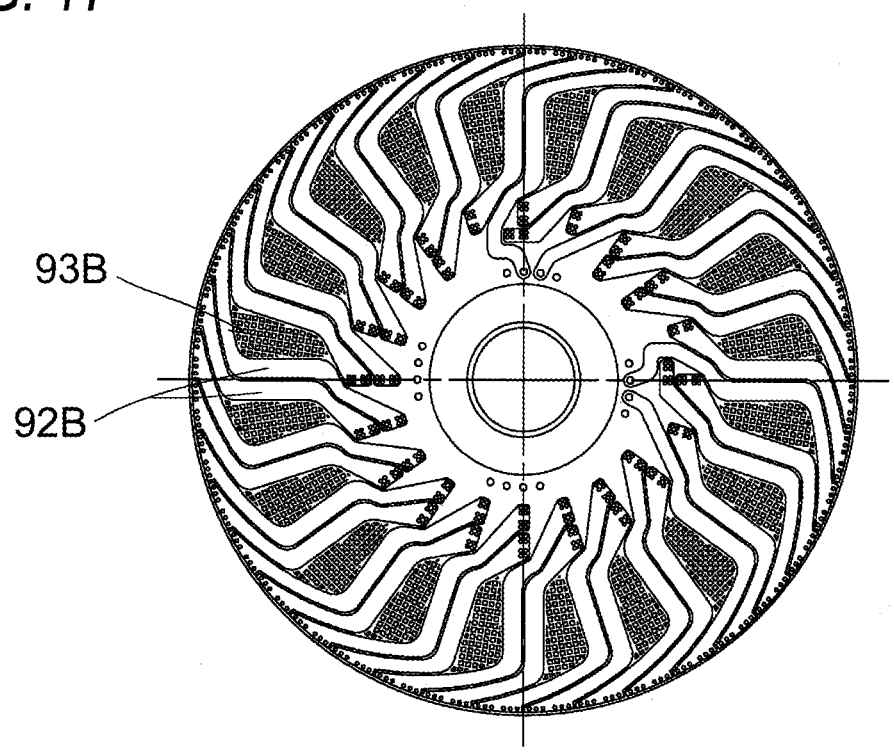
FIG. 11 is a plan view of a coil disk having a reinforcing pattern (Part 2) which is different from the example shown in FIG. 6A, according to the first exemplary embodiment of the invention.

FIG. 11 is a plan view of a coil disk having a reinforcing pattern (Part 2) which is different from the example shown in FIG. 6A. The coil disk shown in FIG. 11 has the same configuration as that of the coil disk shown in FIG. 6A excluding the shape of reinforcing patterns. As shown in FIG. 11, reinforcing patterns 93B according to this modified example are each made up a number of small patterns which are arranged vertically and horizontally. The small patterns have a substantially square shape excluding those disposed at end and edge portions. However, the small patterns may have a circular, oval, triangular or other polygonal shape. A large number of similar small patterns are arranged vertically and horizontally on an opposite surface of the coil disk (not shown). With the reinforcing patterns provided according to this modified example, the eddy-current loss can also be suppressed to a low level.

Figure 12:
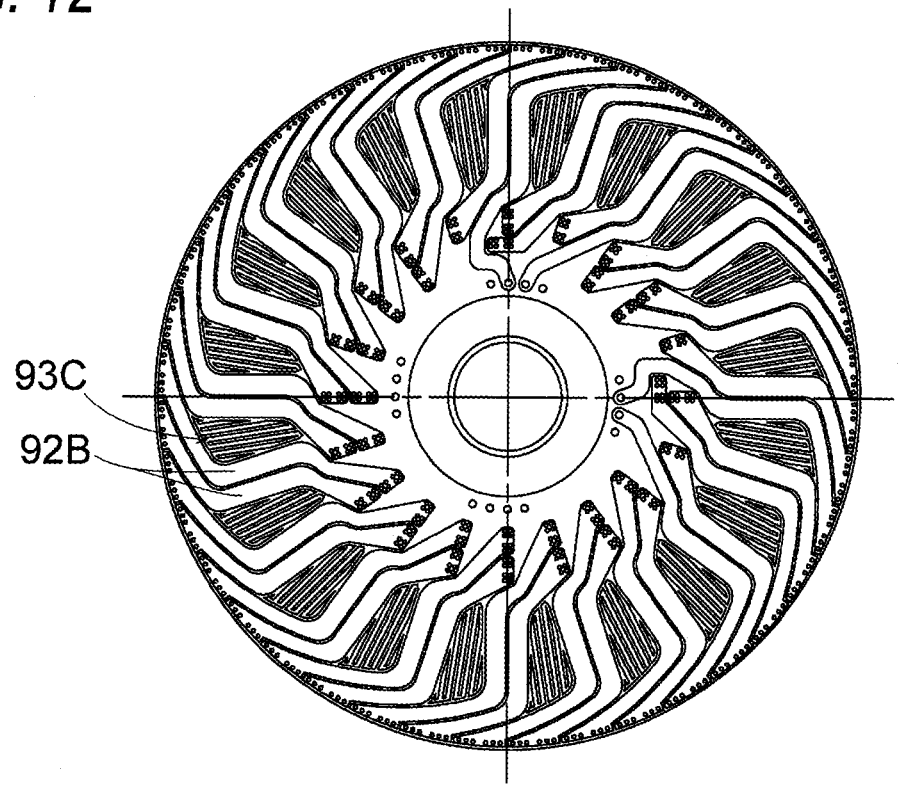
FIG. 12 is a plan view of a coil disk having a reinforcing pattern (Part 3) which is different from the example shown in FIG. 6A, according to the first exemplary embodiment of the invention.
Figure 13:
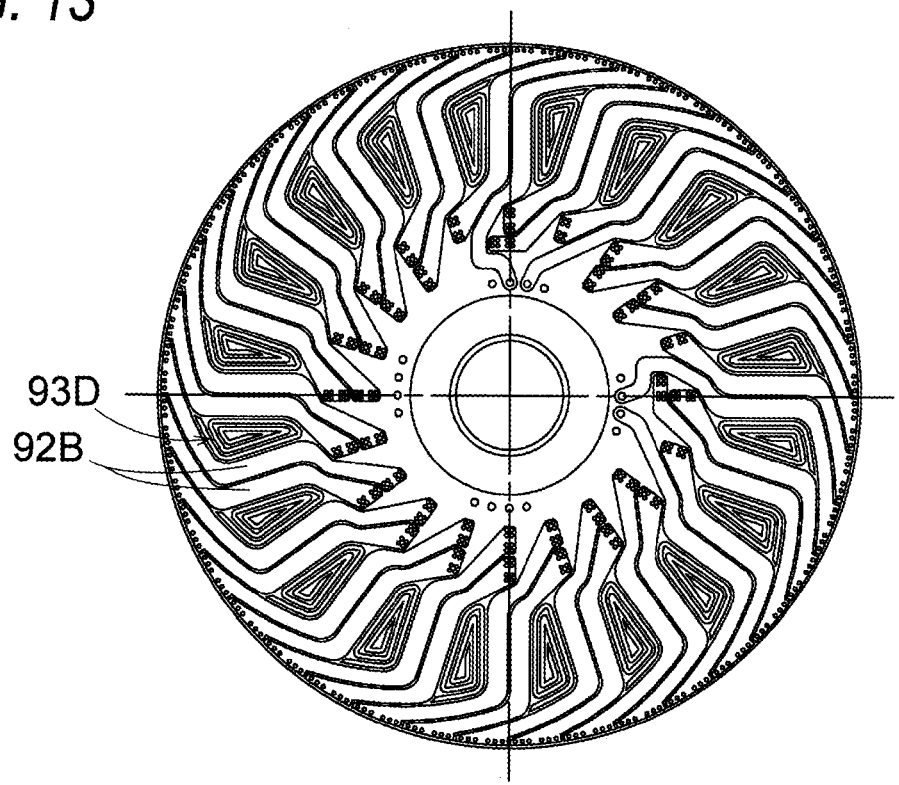
FIG. 13 is a plan view of a coil disk having a reinforcing pattern (Part 4) which is different from the example shown in FIG. 6A, according to the first exemplary embodiment of the invention.

FIG. 12 is a plan view of a coil disk having a reinforcing pattern (Part 3) which is different from the example shown in FIG. 6A. The coil disk shown in FIG. 12 has the same configuration as that of the coil disk shown in FIG. 6A excluding the shape of reinforcing patterns. As shown in FIG. 12, reinforcing patterns 93C according to this modified example are each made up a continuous small pattern which is folded in a reciprocating fashion. The shape of the continuous small pattern may be a swirling reinforcing patterns 93C into which a reinforcing pattern (Part 4) is formed as shown in FIG. 13. With the reinforcing patterns provided according to this modified example, the eddy-current loss can also be suppressed to a low level.

The reinforcing patterns of the plural coil disks which make up the disk motor may be different from one coil disk to another. In addition, the reinforcing patterns on one surface may be different from the reinforcing patterns on the other surface of the single coil disk. Additionally, the reinforcing patterns on one surface or the other surface of the single coil disk may be different from one inter-radial pattern group area to another.

Neither an upper surface of the uppermost coil disk (the first coil disk 361 in FIG. 4) nor a lower surface of the lowermost coil disk (the fourth coil disk 364 in FIG. 4) faces any sheet-shaped bonding layer. However, the uniform height is ensured over the surfaces of the coil disks, and therefore, there is provided an advantage that a uniform pressure can easily be applied to the entire surfaces of the coil disks at the time of hot pressing.

The reinforcing patterns may be provided only on either of the two surfaces which sandwich the sheet-shaped bonding layer. In this case, too, the inter-coil disk bonding force can be enhanced higher than the conventional disk motor.

Although the reinforcing patterns may be electrically insulated from the coil patterns as described in the first exemplary embodiment, the reinforcing patterns may not be electrically isolated from the coil patterns as long as the reinforcing patterns do not constitute electric current paths or do not constitute part of a closed circuit.

The reinforcing patterns do not have to be divided into the small patterns. Even in the event that the reinforcing pattern is made up of a single large conductive layer, although the problem with the eddy-current loss continues to exist, the inter-coil disk bonding force can be strengthened, compared to the conventional disk motor.

One or all of the coil disks may be a single-sided substrate. In this case, too, the sheet-shaped bonding layer 507 may be sandwiched by surfaces of the coil disks on which the reinforcing patterns 93 are formed.

The plural coil disks may be laminated together without being offset from each other angularly. Namely, the plural coil disks can be laminated together so that the radial pattern groups 92B (and the reinforcing patterns 93) face each other with the sheet-shaped bonding layer 507 sandwiched therebetween.

The shapes of the coil disks and the commutator substrate may not be a strictly circular disk shape but may be a shape which can substantially be defined as a circular shape as viewed axially.

In addition, the number of magnets, the angular intervals at which the magnets are disposed, the number of times the coil patterns round (the number of rows of coil pattern), the number of coil disks laminated one on another, the number of pin insertion holes or through holes, and other parameters can be set as and when required according to the performance and/or costs required. In addition, the number of times the coil patterns round may differ from one coil disk to another. In the case of the coil patterns rounding once, the "partial coil pattern group," "inner communication pattern group," "radial patter group," and "outer communication pattern group" should instead be read as those excluding the "group."

In addition to the bush cutter illustrated in the first exemplary embodiment, the electric working machine may be various types of electric tools having a rotational driving unit including a disk motor such as a belt sander or a rotary band saw which incorporates a disk motor.

Second Exemplary Embodiment

Hereinafter, the second exemplary embodiment of the invention will be described in detail by reference to the drawings. The second exemplary embodiment differs from the first exemplary embodiment in that a commutator disk 1035 is used instead of the commutator substrate 35 and first to fourth coil disks 1361 to 1364 are used instead of the first to fourth coil disks 361 to 364. Meanwhile, in the second exemplary embodiment, the same members as those of the first exemplary embodiment are indicated with the same reference numerals and the descriptions thereof are omitted.

Figure 14:
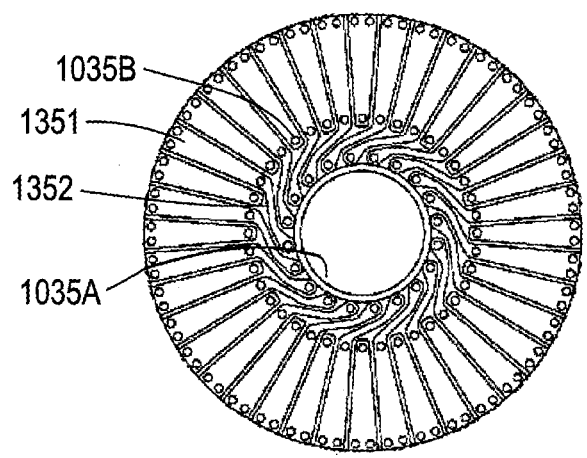
FIG. 14 is a plan view of a commutator disk shown in FIG. 4, according to a second exemplary embodiment of the invention.

FIG. 14 is a plan view of the commutator disk 1035 shown in FIG. 4. A through hole 1035A formed in a center of the circular disk-shaped commutator disk 1035 is formed so that the cylindrical portion 37A shown in FIG. 4 is inserted therethrough. A predetermined number of pin insertion holes 1035B are provided equidistant from the center of the commutator disk 1035, and pins like the pin 40 shown in FIG. 4 are selectively inserted through part of the pin insertion holes 35B. A commutator pattern 1351 formed on the commutator disk 1035 is divided radially into 40 segments. Two segments having seven segments therebetween (a first segment and a ninth segment, a second segment and a tenth segment) are connected to each other by connection patterns 1352 formed radially inside of the segments and connection patterns, not shown, which are formed on an opposite surface.

Figure 15:
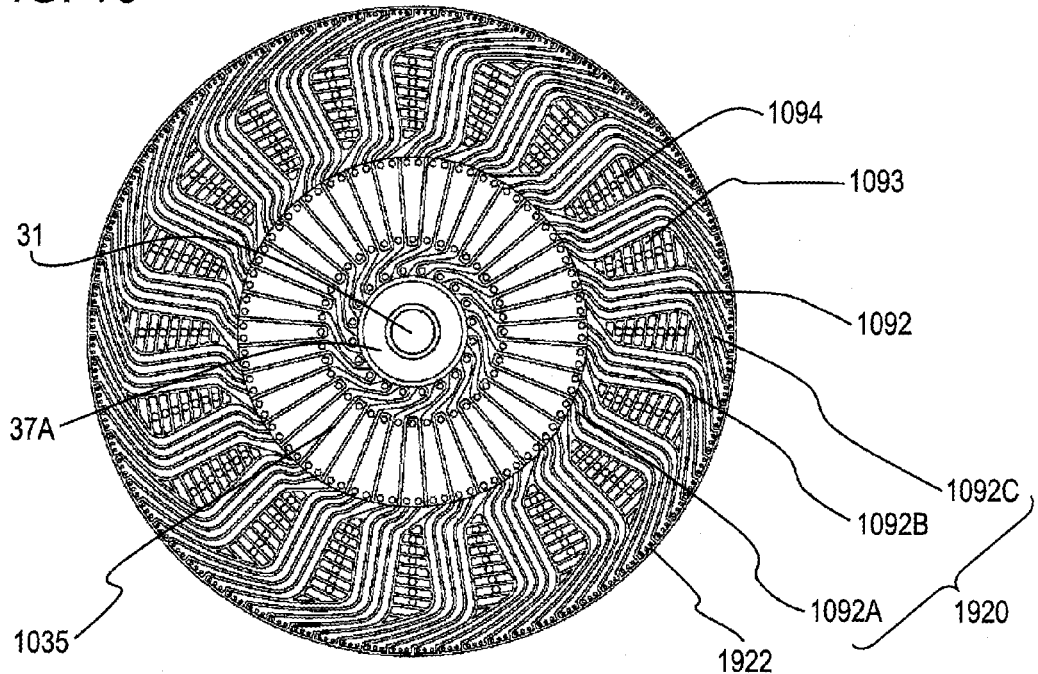
FIG. 15 is a plan view of a rotor shown in FIG. 4, according to the second exemplary embodiment of the invention.
Figure 16:
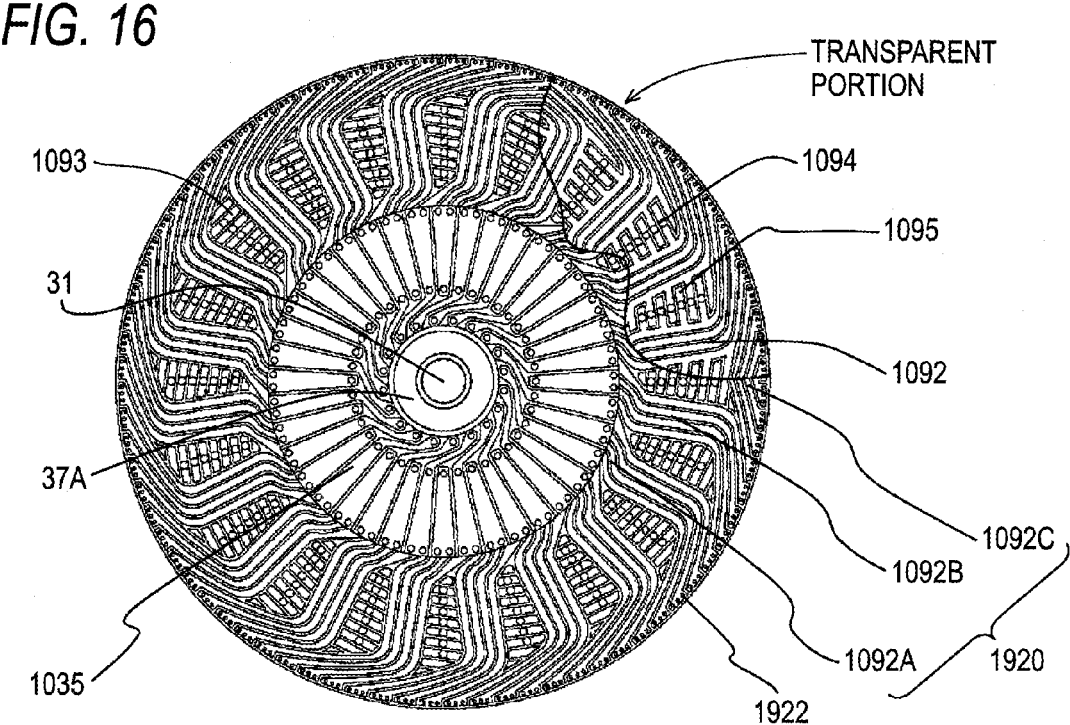
FIG. 16 is a partially transparent view of the rotor of FIG. 15, according to the second exemplary embodiment of the invention.
Figure 17A:
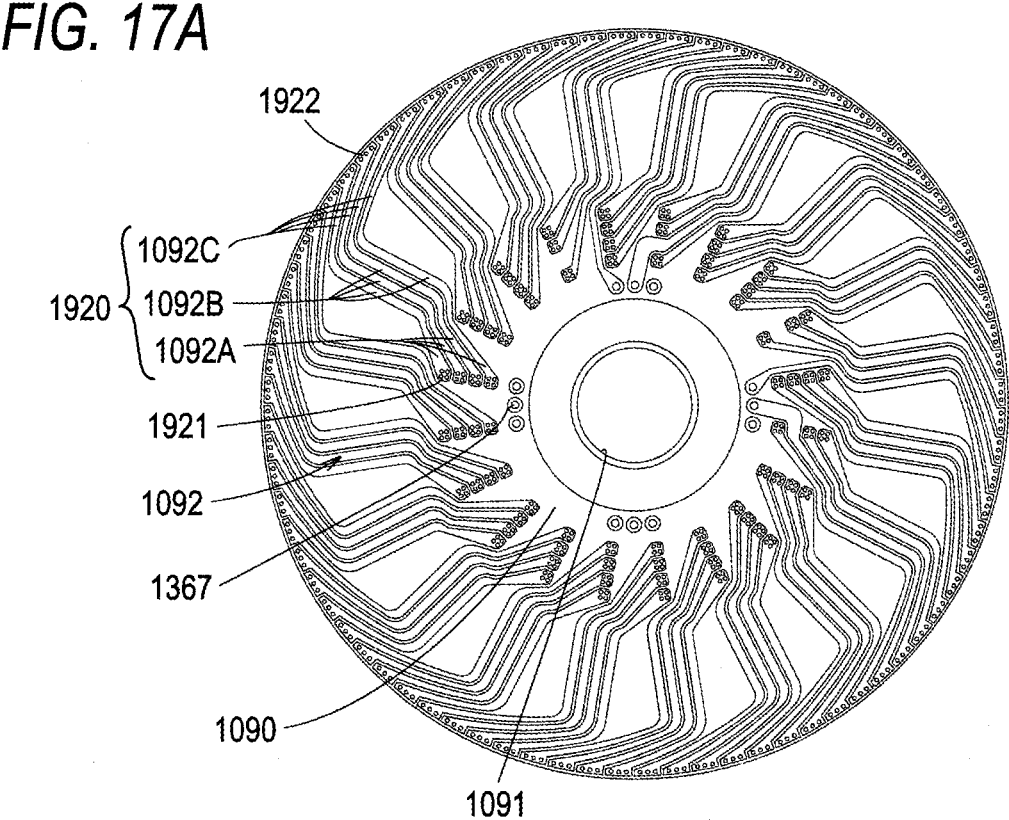
FIG. 17A is a reference plan view of a first coil disk which is free from independent radiating patterns.
Figure 17B:
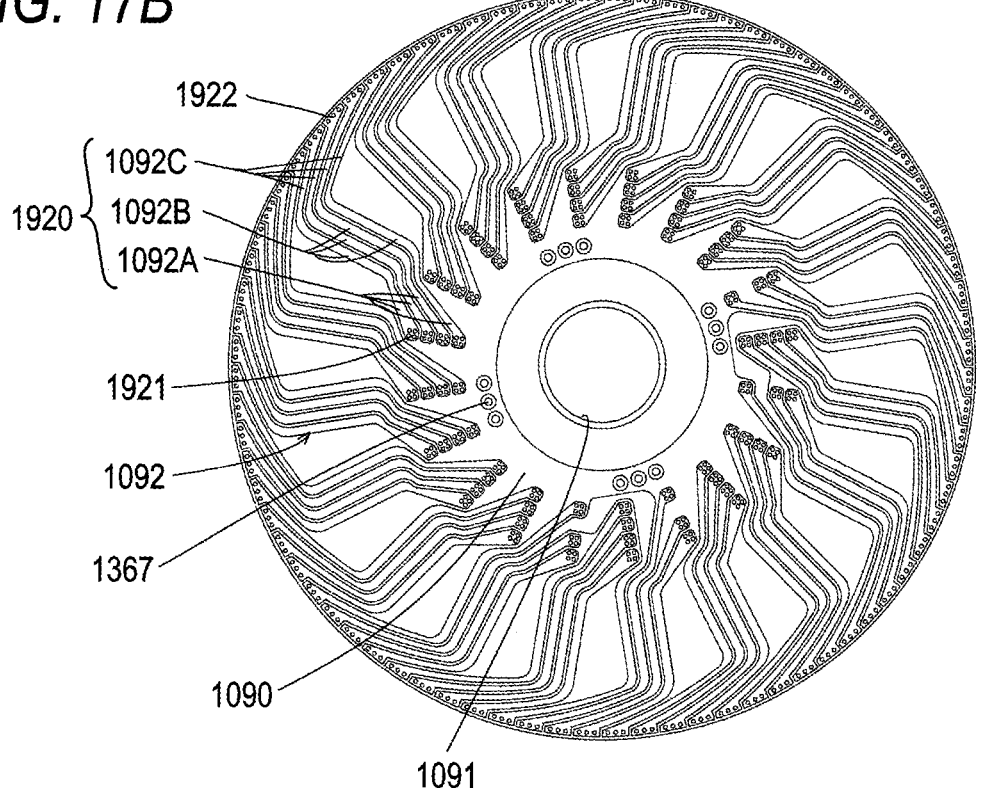
FIG. 17B is a reference bottom view of the first coil disk which is free from extended radiating patterns, according to the second exemplary embodiment of the invention.

FIG. 15 is a plan view of the rotor 82 shown in FIG. 4. FIG. 16 is a partially transparent view of the rotor 82 of FIG. 4 showing a conductor pattern on a lower surface of the first coil disk 1361 in a transparent fashion in a top right-hand side portion of the drawing. As shown in these figures, the first coil disk 1361 has coil patterns 1092 and independent radiating patterns 1093 on an upper surface and coil patterns 1092 and extended radiating patterns 1095 on the lower surface thereof. FIG. 17A is a reference plan view of a first coil disk 1361 which is free from independent radiating patterns 1093. FIG. 17B is a reference bottom view of the first coil disk 1361 which is free from extended radiating patterns 1095. The other coil disks have the same coil patterns as the first coil disk 1361, and therefore, only the coil patterns of the first coil disk 1361 will be described here.

The coil patterns 1092 are made of copper or other conductive materials. A conductive material such as copper is laminated on either surface of a circular disk-shaped insulation substrate, and a mask is placed on the conductive material laminated on either surface of the insulation substrate 1090 for etching for formation of coil patterns 1092. The coil patterns 1092 include partial coil pattern groups 1920 and 20 partial coil pattern groups 1920 are provided on one surface (one layer) of the insulation substrate. Each partial coil pattern group 1920 includes four rows of elongated partial coil patterns which lie close to each other and have substantially the same width. The partial coil pattern group 1920 is formed by connecting sequentially an inner communication pattern group 1092A, a radial pattern group 1092B and an outer communication pattern group 1092C in that order. The inner communication pattern groups 1092A on both the surfaces of the insulation substrate 1090 are electrically connected to each other by through holes 1921 which are formed in the vicinity of end portions of the elongated partial coil patterns. The outer communication pattern groups 1092C on both the surfaces of the insulation substrate 1090 are electrically connected to each other by through holes 1922 which are formed in the vicinity of the other end portions of the elongated partial coil patterns. The radial pattern group 1092B extends radially outwards from a central portion of the insulation substrate 1090 so as to be stretched between the inner communication pattern group 1092A and the outer communication pattern group 1092C. The radial pattern groups 1092B on both the surfaces of the insulation substrate 1090 are present substantially in the same position as viewed axially. The radial pattern groups 1092B of each coil disk are positioned directly above a circumference along which the magnets 41 shown in FIGS. 2 and 3 are aligned (a circumference along which centers of the magnets 41 are aligned). Namely, the radial pattern groups 1092B pass directly above the magnets 41 as each coil disk rotates. A rotational force is obtained by an electromagnetic force between an electric current which flows to the radial pattern groups 1092B and magnetic fields generated by the magnets 41.

The radial pattern groups 1092B on each surface of each coil disk are disposed at equal angular intervals around the center of the coil disk. Consequently, on each surface of each coil disk, there are areas where no coil pattern 1092 exists (hereinafter, also referred to as an "inter-radial pattern group area") between the adjacent radial pattern groups 1092B. The independent radiating patterns 1093 or the extended radiating patterns 1095 are provided in these inter-radial pattern group areas as shown in FIGS. 15 and 16.

Figure 18:
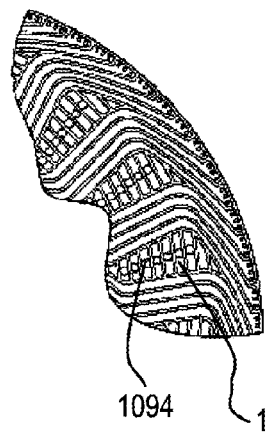
FIG. 18 shows partially transparent views of different layers of respective coil disks which make up the rotor shown in FIG. 4, according to the second exemplary embodiment of the invention.
Figure 18:
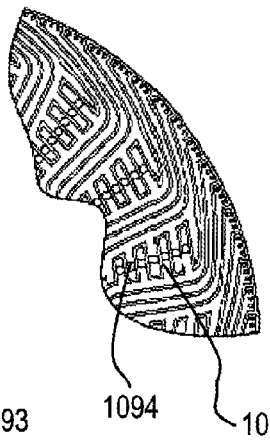
Figure 18:
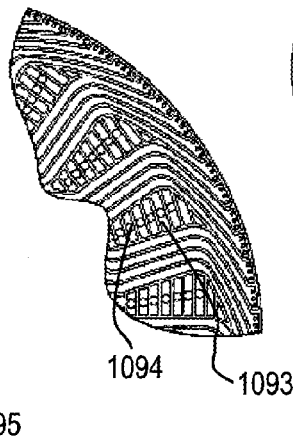
Figure 18:
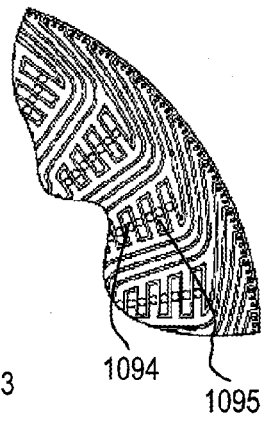
Figure 18:
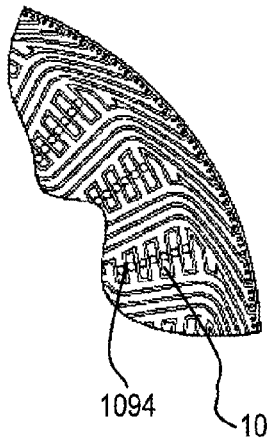
Figure 18:
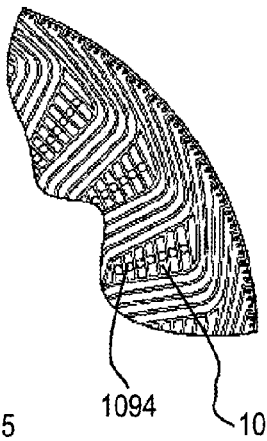
Figure 18:
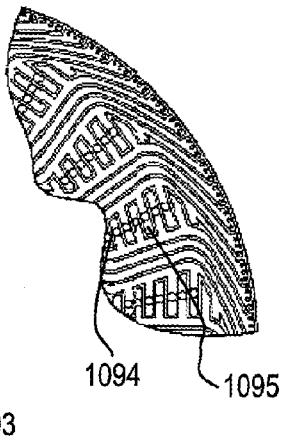
Figure 18:
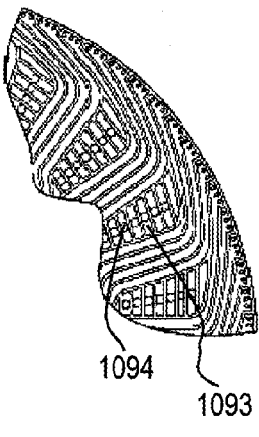

FIG. 18 shows partially transparent views of different layers formed on respective coil disks which make up the rotor 82 shown in FIG. 4. In FIG. 18, a layer on the upper surface of the first coil disk 1361 is referred to as a first layer 1361A, a layer on the lower surface of the same coil disk as a second layer 1361B, a layer on an upper surface of the second coil disk 1362 as a third layer 1362A, a layer on a lower surface of the same coil disk as a fourth layer 1362B, a layer on an upper surface of the third coil disk 1363 as a fifth layer 1363A, a layer on a lower surface of the same coil disk as a sixth layer 1363B a layer on an upper surface of the fourth coil disk 1364 as a seventh layer 1364A, and a layer on a lower surface of the same coil disk as an eighth layer 1364B.

Independent radiating patterns 1093 are provided in the inter-radial pattern areas on the first layer 1361A. Similarly, independent radiating patterns 1093 are provided in inter-radial pattern areas on the third layer 1362A, the sixth layer 1363B and the eighth layer 1364B. In addition, extended radiating patterns 1095 are provided in the inter-radial pattern areas on the second layer 1361B. Similarly, extended radiating patterns 1095 are provided in inter-radial pattern areas on the fourth layer 1362B, the fifth layer 1363A, and the seventh layer 1364A. Surfaces of the independent radiating patterns 1093 on the first layer 1361A and the eighth layer 1364B are totally exposed to be touched by air.

Figure 19:
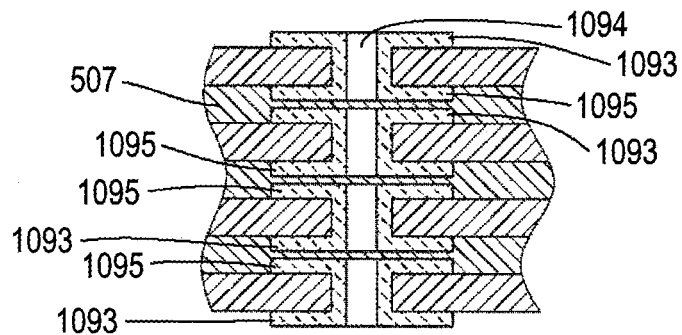
FIG. 19 is a schematic sectional view showing an interlayer connecting construction of the independent radiating patterns and the extended radiating patterns.

FIG. 19 is a schematic sectional view showing an interlayer connecting construction of the independent radiating patterns and the extended radiating patterns. The independent radiating pattern 1093 on the first layer 1361A and the extended radiating pattern 1095 on the second layer 1361B are connected to each other by a radiating through hole 1094 as a radiating hole. The independent radiating patterns 1093 and the extended radiating patterns 1095 on pairs of the third layer 1362A and the fourth layer 1362B, the fifth layer 1363A and the sixth layer 1363B, and the seventh layer 1364A and the eighth layer 1364B are also connected to each other by the radiating through hole 1094. An inner surface of the radiating through hole 1094 is plated with a material such as copper having a high heat transfer rate. Alternatively, an interior of the radiating through hole 1094 may be filled with a material such as copper having a high heat transfer rate.

As shown in FIG. 18, plural independent radiating patterns 1093 extend substantially in a circumferential direction and are kept untouchable (insulated) from the coil patterns 1092 which are present on the same layer. On the other hand, the extended radiating patterns 1095 extend from the radial patterns which face the inter-radial pattern areas of the radial patterns which make up the radial pattern groups 1092B which are present on the same layer (hereinafter, referred to as an "extension-originated radial pattern"). Specifically, plural extended radiating patterns 1095 extend from both extension-originated radial patterns which face each other across an inter-radial pattern group area in the circumferential direction in a comb tooth-like fashion. A layout pattern is adopted in which extended radiating patterns which extend from extension-originated radial patterns on one side enter between extended radiating patterns which extend from extension-originated radial patterns on the other side.

Figure 20:
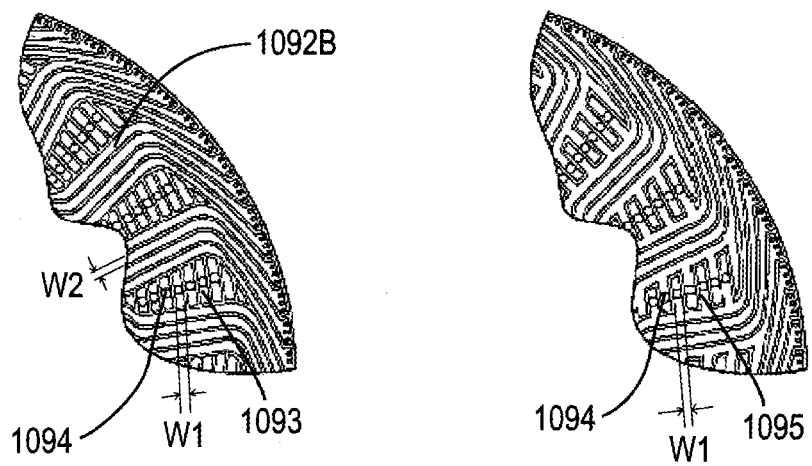
FIG. 20 shows explanatory diagrams of widths of the independent radiating pattern and the extended radiating pattern and a width of a radial pattern, according to the second exemplary embodiment of the invention.

The independent radiating patterns 1093 and the extended radiating patterns 1095 are made of a material such as copper having a high heat transfer rate and are preferably made of the same material as that of the coil patterns 1092. In addition, as shown in FIG. 20, widths W1 of the independent radiating pattern 1093 and the extended radiating pattern 1095 are equal to or thinner than a width W2 of the extension-originated radial pattern (W1≤W2). Each extended radiating pattern 1095 extends only from one location of one extension-originated radial pattern, and therefore, it results in a dead-end electric current path. An electric current path which passes through the extended radiating pattern 1095 has a high electric resistance, compared to an electric current path which passes through the extension-originated radial pattern. Because of this, in an electric current supplied to the coil patterns 1092, an electric current which leaks to the extended radiating patterns 1095 can be reduced to a sufficiently low level, compared to an electric current which flows to the extension-originated radial patterns.

According to the second exemplary embodiment, the following advantages can be provided.

(1) The independent radiating patterns 1093 and the extended radiating patterns 1095 are provided and are connected to each other by the radiating through holes 1094. Thus, compared to the case where those radiating patterns are not provided, the coil patterns 1092 can be cooled efficiently. Hereinafter, this will be described specifically. Heat generated as a result of an electric current flowing through the coil patterns 1092 is transferred to the extended radiating patterns 1095 for radiation. The extended radiating pattern 1095 is formed so as to have a higher electric resistance than that of the current path through which an electric current flowing to the coil pattern 1092 passes, and therefore, the flow of electric current therethrough is made difficult. Thus, the extended radiating pattern 1095 can enhance the radiating efficiency while suppressing the loss of electric current. Further, in the case of the multi-layer construction, the cooling of the coil patterns 1092 become more difficult as the layers exist deeper inside the construction. In the configuration of the second exemplary embodiment, it becomes most difficult to cool the fourth layer 1362B and the fifth layer 1363A, while the cooling of the layers becomes easier as the layers exist farther away from the center of the construction, thus, the cooling becoming easier towards the third layer 1362A and the sixth layer 1363B, the second layer 1361B and the seventh layer 1364A, and the first layer 1361A and the eighth layer 1364B. Then, the extended radiating patterns 1095 are provided on the second layer 1361E which is more difficult to be cooled than the first layer 1361A, and the independent radiating patterns 1093 are provided on the first layer 1361A, whereby the extended radiating patterns 1095 and the independent radiating patterns 1093 are thermally connected together by the radiating through holes 1094. Because of this, heat generated in the coil patterns 1092 on the second layer 1361B is transferred sequentially to the extended radiating patterns 1095, the radiating through holes 1094 and the independent radiating patterns 1093 in that order and is eventually radiated to the atmosphere at the first layer 1361A which can be cooled relatively easily. The same cooling effect can be established also at the third layer 1362A and the fourth layer 1362B, the eighth layer 1364B and the seventh layer 1364A, and the sixth layer 1363B and the fifth layer 1363A. In this way, heat at the highly heated portion in the interior of the laminated coil disks to which the cooling air does not flow is transferred to the independent radiating patterns 1093 which exist on the superficial layers which are easily cooled via the extended radiating patterns 1095 and the radiating through holes 1094. Therefore, the good cooling efficiency can be provided. In particular, since the independent radiating patterns 1093 on the first layer 1361A and the eighth layer 1364B are exposed to outside air, they can be cooled efficiently by the cooling air.

(2) The widths of the independent radiating pattern 1093 and the extended radiating pattern 1095 are equal to or thinner than the width of the radial patterns. Because of this, compared to a case where the widths of those radiating patterns are wider, the eddy-current loss (heat generation) generated in the independent radiating patterns 1093 and the extended radiating patterns 1095 can be reduced, and therefore, the good cooling efficiency can be provided.

(3) The extended radiating patterns 1095 are made of the same material as that of the radial patterns. Therefore, heat generated in the coil patterns 1092 are easily transferred to the extended radiating patterns 1095, whereby the cooling efficiency is improved. Further, the extended radiating patterns 1095 can be formed through the same etching operation that is performed to form the coil patterns 1092. Therefore, the manufacturing process can be simplified, thereby making it possible to suppress the increase in production costs. The independent radiating patterns 1093 are also made of the same material as that of the radial pattern and hence, can be formed through the same etching operation that is performed to form the radial patterns.

(4) The electric current paths which pass through the independent radiating patterns 1093 and the extended radiating patterns 1095 have the larger electric resistance than that of the electric current path which passes through the radial pattern groups 1092B. Because of this, the electric current supplied to the coil patterns 1092 is made difficult to flow to the independent radiating patterns 1093 and the extended radiating patterns 1095. Thus, the heat values of the independent radiating patterns 1093 and the extended radiating patterns 1095 are very small, and hence, the cooling efficiency is improved. In addition, the influence imposed on the motor by providing the independent radiating patterns 1093 and the extended radiating patterns 1095 is sufficiently small or none.

(5) The independent radiating patterns 1093 and the extended radiating patterns 1095 are provided in the inter-radial pattern group areas which have conventionally not been used effectively, and the areas of the coil disk substrates do not have to be increased for provision of those radiating patterns. Namely, according to the second exemplary embodiment, the cooling performance can be increased without increasing the areas of the coil disk substrates.

(6) As has been described heretofore, the rotor 82 of the second exemplary embodiment has the superior cooling performance, and therefore, the rotor 82 can withstand even heat generated when it is incorporated in a high-output disk motor. Thus, the rotor 82 is advantageous in increasing the performance of the disk motor and the electric working machine including the same disk motor.

Thus, while the invention has been described by reference to the second exemplary embodiment thereof, it is obvious to those skilled in the art to which the invention pertains that various modifications can be made to the constituent elements and the process in which they are treated of the second exemplary embodiment without departing from the scope of claims that will be claimed later. Hereinafter, modified examples will be described.

Figure 21:
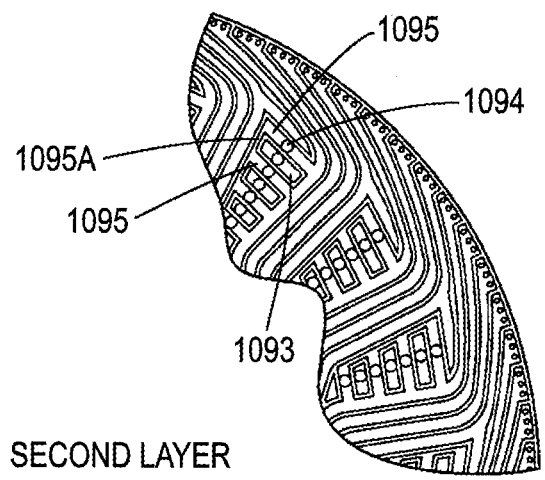
FIG. 21 is an explanatory diagram of a modified example of radiating patterns on a second layer, according to the second exemplary embodiment of the invention.

FIG. 21 is an explanatory diagram of a modified example of radiating patterns on the second layer 1361B. In the modified example shown in this figure, a thin pattern 1095A is provided so as to be stretched between distal ends of adjacent extended radiating patterns 1095. In addition, an independent radiating pattern 1093 is provided between the adjacent extended radiating patterns 1095. A width of the thin pattern 1095A is narrower than a width of the extended radiating pattern 1095, and hence, the thin pattern 1095A has a higher electric resistance than that of the extended radiating pattern 1095. Also, with this modified example in which the thin pattern 1095A is stretched between the distal ends of the extended radiating patterns 1095, an electric current that flows to the extended radiating pattern 1095 is sufficiently small. A similar modification can also be made to a fourth layer 1362B, a fifth layer 1363A and a seventh layer 1364A. In addition, in the event that the extended radiating pattern 1095 is formed so as to have an extremely high electric resistance, adjacent partial coil pattern groups 1920 may be connected to each other.

The independent radiating pattern 1093 may extend in the radial direction. In this case, too, the same number of independent radiating patterns 1093 as that of extended radiating patterns 1095 are provided in each inter-radial pattern group area and are thermally connected to the extended radiating patterns 1095 by a radiating through hole 1094.

In addition, the extended radiating pattern 1095 may also extend in the radial direction. In this case, the extended radiating pattern 1095 may be caused to extend not from a portion of a radially extending coil pattern 1092 which faces a magnet as in the second exemplary embodiment but from a portion which is positioned radially inwards and outwards and which is bent in the circumferential direction (for example, an inner communication pattern or an outer communication pattern).

The independent radiating patterns 1093 and the extended radiating patterns 1095 are desirably disposed so as to keep a uniform weight balance along the full circumference of the layer, whereby the rotor 82 is allowed to rotate in a stable fashion. In the second exemplary embodiment, the independent radiating patterns 1093 and the extended radiating patterns 1095 are formed so that similar patterns appear in symmetrical positions with respect to the rotational shaft of the rotor 82.

The shapes of the coil disks and the commutator substrate may not be a strictly circular disk shape but may be a shape which can substantially be defined as a circular shape as viewed axially.

In addition, the number of magnets, the angular intervals at which the magnets are disposed, the number of times the coil patterns round (the number of rows of coil pattern), the number of coil disks laminated one on another, the number of pin insertion holes or through holes, and other parameters can be set as and when required according to the performance and/or costs required. In addition, the number of times the coil patterns round may differ from one coil disk to another. In the case of the coil patterns rounding once, the "partial coil pattern group," "inner communication pattern group," "radial patter group," and "outer communication pattern group" should instead be read as those excluding the "group."

In addition to the bush cutter illustrated in the second exemplary embodiment, the electric working machine may be various types of electric tools having a rotational driving unit including a disk motor such as a belt sander or a rotary band saw which incorporates a disk motor.

The invention may also be applied to a brushless motor where a rotor functions as the magnet generating portion and a stator is provided with the coil disk.

This application claims priority from Japanese Patent Application No. 2011-017414 filed on Jan. 31, 2011 and Japanese Patent Application No. 2011-142461 filed on Jun. 28, 2011, the entire contents of which are incorporated herein by reference.

INDUSTRIAL APPLICABILITY

According to an aspect of the invention, there is provided a disk motor having at least two coil disks which are bonded to each other and adapted to increase a bonding strength with which the two coil disks are bonded together and an electric working machine including the disk motor, and a method for manufacturing the disk motor.

According to another aspect of the invention, there is provided a disk motor having a better radiating performance and an electric working machine including the disk motor.

What is claimed is:

1. A disk motor comprising:
   a rotor;
   a stator;
   an output shaft concentrically fixed to the rotor;
   at least one coil disk which is provided to one of the rotor or the stator, a coil pattern which includes a plurality of radial patterns or radial pattern groups extending outwards in a radial direction from a center part of the coil disk being formed on at least one surface of the coil disk;
   an electric current supply portion which supplies electric current to the coil pattern;
   a magnetic flux generating portion which is provided to another of the rotor or the stator and faces the coil pattern; and
   an intermediate pattern which is formed between adjacent radial patterns or adjacent radial pattern groups on the coil disk,
   wherein the coil disk includes at least two coil disks which are bonded to each other,
   wherein the intermediate pattern includes a reinforcing pattern,
   wherein the surface of the coil disk on which the reinforcing pattern is formed constitutes a bonding surface with another coil disk,
   wherein the at least two coil disks includes a first coil disk and a second coil disk,
   wherein the coil pattern is provided on at least a first surface of the first coil disk and a second surface of the second coil disk, the first surface and the second surface facing each other,
   wherein the radial patterns or radial pattern groups on the first surface of the first coil disk is positioned between adjacent radial patterns or radial pattern groups on the second surface of the second coil disk when viewed in an axial direction, and
   wherein the reinforcing pattern is formed between adjacent radial patterns or adjacent radial pattern groups on the first surface of the first coil disk so as to overlap the radial patterns or radial pattern groups on the second surface of the second coil disk when viewed in the axial direction.

2. The disk motor according to claim 1, wherein the reinforcing pattern includes small patterns which are electrically insulated from each other.

3. The disk motor according to claim 2, wherein each of the small patterns are narrower in width than the radial pattern and extend substantially parallel to the radial direction of the coil disk.

4. The disk motor according to claim 2, wherein each of the small patterns are narrower in width than the radial pattern and extend substantially vertical to the radial direction of the coil disk.

5. The disk motor according to claim 1, wherein a height of the reinforcing pattern from a substrate surface of the coil disk is substantially the same as that of the coil pattern.

6. The disk motor according to claim 1, wherein the reinforcing pattern is made of the same material as that of the coil pattern.

7. The disk motor according to claim 1, wherein the at least two coil disks are bonded to each other via a sheet-shaped bonding layer which covers substantially an entire surface of the coil disk.

8. The disk motor according to claim 1, wherein the plurality of radial patterns or radial pattern groups are disposed at predetermined intervals in a circumferential direction of the coil disk.

9. The disk motor according to claim 1, wherein the coil pattern is provided on both surfaces of the coil disk and are connected to each other.

10. A disk motor according to claim 1,
   wherein the magnetic flux generating portion generates a magnetic flux to the radial patterns or radial pattern groups, and
   wherein the intermediate pattern includes an extended radiating pattern which extends from the coil pattern.

11. The disk motor according to claim 10, wherein the extended radiating pattern extends only from an arbitrary one of the radial patterns.

12. The disk motor according to claim 10, wherein a width of the extended radiating pattern is equal to or thinner than a width of a portion of the coil pattern from which the extended radiating pattern extends.

13. The disk motor according to claim 10, wherein the extended radiating pattern extends in a substantially circumferential direction from the radial pattern.

14. The disk motor according to claim 10, wherein a plurality of extended radiating patterns extend in a comb tooth shape from both of adjacent radial patterns such that extended radiating patterns extending from one side enter between extended radiating patterns extending from another side.

15. The disk motor according to claim 10, wherein the radial pattern is made of the same material as that of the extended radiating pattern.

16. The disk motor according to claim 10, wherein an electric current which flows through a portion of the coil pattern from which the extended radiating pattern extends is larger than an electric current which flows through the extended radiating pattern.

17. The disk motor according to claim 10,
wherein the coil pattern is formed on at least a first layer and a second layer,
wherein an independent radiating pattern which is isolated from the coil pattern on the first layer is formed between adjacent radial patterns or radial pattern groups on the first layer,
wherein the extended radiating pattern is formed on the second layer, and
wherein the independent radiating pattern and the extended radiating pattern are connected to each other by a heat conductive material which penetrates through the layers.

18. The disk motor according to claim 17, wherein the first layer is positioned on one surface of the coil disk and the second layer is positioned on another surface of the same coil disk.

19. The disk motor according to claim 17,
wherein a radiating hole which stretches between the independent radiating pattern and the extended radiating pattern penetrates a substrate of the coil disk, and
wherein the radiating hole has a conductive film on an inner surface thereof or is filled with a conductive material.

20. The disk motor according to claim 17, wherein the second layer is positioned between the coil disk on which the second layer is formed and a different coil disk which is laminated on the coil disk on which the second layer is formed.

21. The disk motor according to claim 17, wherein an entire surface of the independent radiating pattern is exposed to air.

22. The disk motor according to claim 17, wherein a width of the independent radiating pattern is equal to or thinner than a width of the radial pattern.

23. The disk motor according to claim 10, wherein the plurality of radial patterns or radial pattern groups are formed so as to be disposed at predetermined intervals in the circumferential direction of the coil disk.

24. The disk motor according to claim 1, wherein the coil disk is provided to the rotor.

25. An electric working machine comprising the disk motor according to claim 1.

26. A method for manufacturing a disk motor, the disk motor including,
an output shaft,
at least two coil disks which are concentrically fixed to the output shaft and are bonded to each other, a coil pattern which includes a plurality of radial patterns or radial pattern groups extending outwards in a radial direction from a center part of the coil disk being formed on at least one surface of the respective coil disks,
an electric current supply portion which supplies electric current to the coil pattern, and
a magnetic flux generating portion which faces the coil pattern, the method comprising:
forming a reinforcing pattern between adjacent radial patterns or radial pattern groups together with the coil pattern when etching a conductor layer for forming the coil pattern on at least one of the coil disks; and
fixedly bonding together the two coil disks at a surface where the reinforcing pattern is formed, with a sheet-shaped bonding layer which covers substantially an entire surface of each of the coil disks being sandwiched between the two coil disks,
wherein the at least two coil disks includes a first coil disk and a second coil disk,
wherein the coil pattern is provided on at least a first surface of the first coil disk and a second surface of the second coil disk, the first surface and the second surface facing each other,
wherein the radial patterns or radial pattern groups on the first surface of the first coil disk is positioned between adjacent radial patterns or radial pattern groups on the second surface of the second coil disk when viewed in an axial direction, and
wherein the reinforcing pattern is formed between adjacent radial patterns or adjacent radial pattern groups on the first surface of the first coil disk so as to overlap the radial patterns or radial pattern groups on the second surface of the second coil disk when viewed in the axial direction.

27. A disk motor comprising:
an output shaft;
at least one coil disk which is concentrically fixed to the output shaft, a coil pattern which includes a plurality of radial patterns or radial pattern groups extending outwards in a radial direction from a center part of the coil disk being formed on at least one surface of the coil disk;
an electric current supply portion which supplies an electric current to the coil pattern;
a magnetic flux generating portion which generates a magnetic flux to the radial patterns or radial pattern groups; and
an extended radiating pattern which is formed on the coil disk and extends from the coil pattern,
wherein the coil disk includes at least two coil disks which are bonded to each other,
wherein the at least two coil disks includes a first coil disk and a second coil disk,
wherein the coil pattern is provided on at least a first surface of the first coil disk and a second surface of the second coil disk, the first surface and the second surface facing each other,
wherein the radial patterns or radial pattern groups on the first surface of the first coil disk is positioned between adjacent radial patterns or radial pattern groups on the second surface of the second coil disk when viewed in an axial direction, and
wherein the extended radiating pattern is formed between adjacent radial patterns or adjacent radial pattern groups on the first surface of the first coil disk and is positioned so as to overlap the radial patterns or radial pattern groups on the second surface of the second coil disk when viewed in the axial direction.

* * * * *